(12) United States Patent
Mori et al.

(10) Patent No.: US 6,209,127 B1
(45) Date of Patent: Mar. 27, 2001

(54) TERMINAL DEVICE CAPABLE OF REMOTE DOWNLOAD, DOWNLOAD METHOD OF LOADER PROGRAM IN TERMINAL DEVICE, AND STORAGE MEDIUM STORING LOADER PROGRAM

(75) Inventors: Toshiya Mori, Settsu; Takashi Kakiuchi, Toyonaka; Tetsuji Maeda, Nara; Hisayuki Kino, Ikoma-gun; Yoshiyuki Miyabe, Osaka, all of (JP)

(73) Assignee: Matsushita Electrical Industrial Co., LTD, Osaka (JP)

( * ) Notice: Subject to any disclaimer, the term of this patent is extended or adjusted under 35 U.S.C. 154(b) by 0 days.

(21) Appl. No.: 09/090,685

(22) Filed: Jun. 4, 1998

(30) Foreign Application Priority Data

Jun. 5, 1997 (JP) .................................................. 9-148067

(51) Int. Cl.$^7$ .................................................. G06F 9/445
(52) U.S. Cl. .................................................. 717/11; 717/1
(58) Field of Search .................................. 395/707, 708, 395/709, 710, 712; 717/1, 11

(56) References Cited

U.S. PATENT DOCUMENTS

| | | |
|---|---|---|
| 5,029,078 | 7/1991 | Iwai . |
| 5,247,683 * | 9/1993 | Holmes et al. ....................... 709/221 |
| 5,343,437 | 8/1994 | Johnson et al. . |
| 5,379,429 | 1/1995 | Hirasawa et al. . |
| 5,432,927 | 11/1995 | Grote et al. . |
| 5,450,589 | 9/1995 | Maebayashi et al. . |
| 5,596,738 | 1/1997 | Pope . |
| 5,666,293 | 9/1997 | Metz et al. . |
| 5,675,727 | 10/1997 | Watanabe . |
| 5,680,547 | 10/1997 | Chang . |
| 5,764,992 * | 6/1998 | Kullick et al. ........................ 395/712 |
| 5,771,064 * | 6/1998 | Lett ......................................... 348/10 |
| 5,787,288 * | 7/1998 | Nagata et al. .......................... 717/11 |
| 5,915,112 * | 6/1999 | Boutcher .............................. 395/712 |
| 5,960,189 * | 9/1999 | Stupek, Jr. et al. ............. 395/500.43 |
| 5,974,454 * | 10/1999 | Apfel et al. ........................... 709/221 |
| 6,009,274 * | 12/1999 | Fletcher et al. ...................... 395/712 |
| 6,014,725 * | 1/2000 | Kind et al. ............................. 711/103 |
| 6,038,399 * | 3/2000 | Fisher et al. ......................... 395/712 |
| 6,070,012 * | 5/2000 | Eitner et al. .......................... 395/712 |
| 6,074,434 * | 6/2000 | Cole et al. .............................. 717/11 |
| 6,074,435 * | 6/2000 | Rojest.ang.l .......................... 717/11 |

* cited by examiner

*Primary Examiner*—Tariq R. Hafiz
*Assistant Examiner*—Ted T. Vo
(74) *Attorney, Agent, or Firm*—Price and Gess

(57) ABSTRACT

Memory is divided into a plurality of banks to store software which is upgraded one bank at a time. By doing so, a memory with the same size as one bank is only needed as the temporary storage used when performing an upgrade. The terminal device only needs a memory that is "1+1/n" times as large as a total software when there are n banks, while a conventional terminal device needs a memory that is twice as large as the total software. Two loader programs are stored in different banks as a master loader program used for download processing and a backup loader program. On receiving a new loader program, one loader program is used to write the new loader program over the other loader program so as to upgrade the loader program. The backup loader program is activated when the new loader program is to be written over the master loader program.

9 Claims, 17 Drawing Sheets

PrgHeader

SOFTWARE MODULE FORMAT

MODULE HEADER

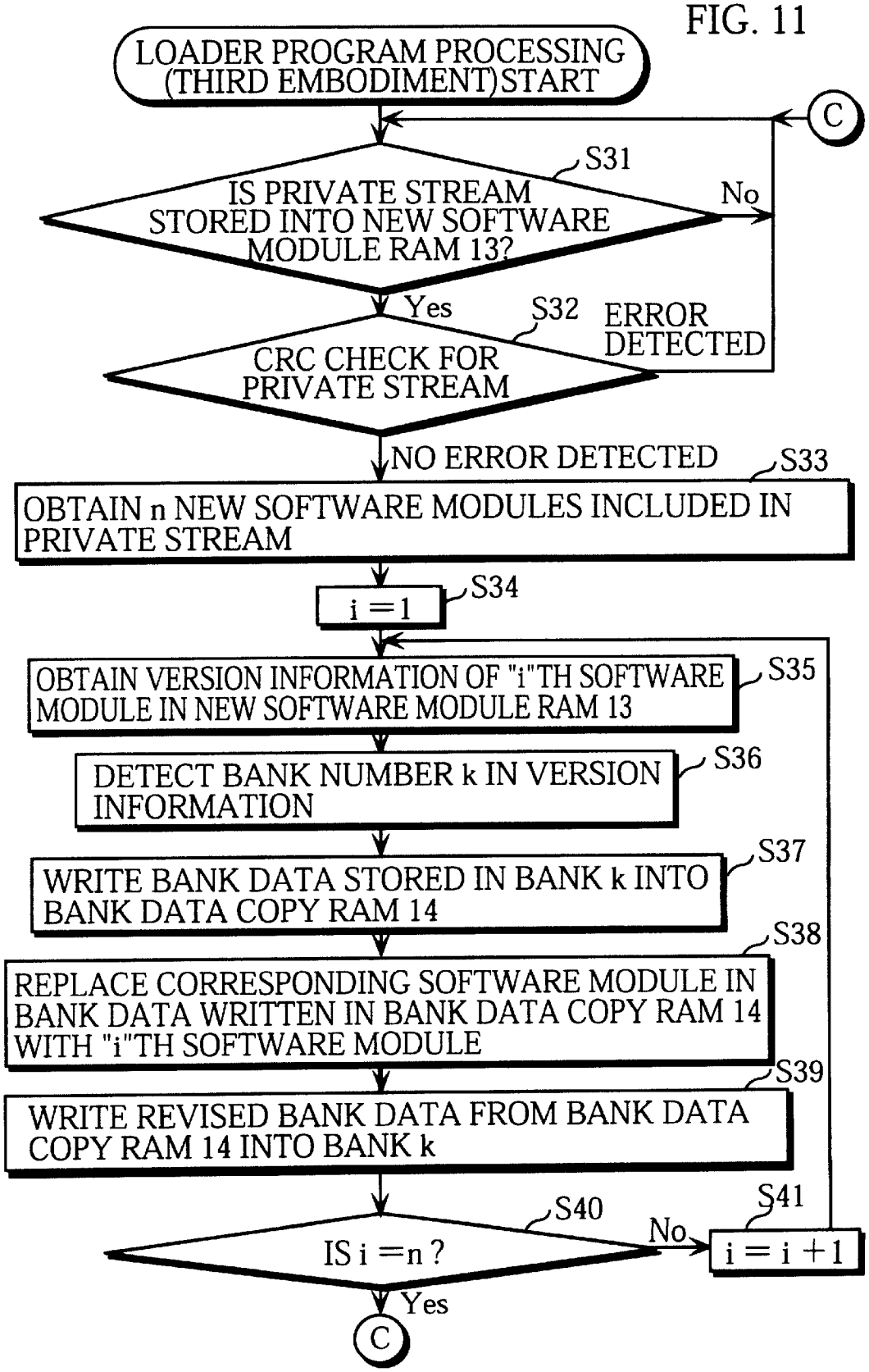

TERMINAL DEVICE CAPABLE OF REMOTE DOWNLOAD, DOWNLOAD METHOD OF LOADER PROGRAM IN TERMINAL DEVICE, AND STORAGE MEDIUM STORING LOADER PROGRAM

BACKGROUND OF THE INVENTION

1. Field of the Invention

The present invention relates to a terminal device in a service system using a cable or wireless communication medium, a download method of a loader program in the terminal device, and a storage medium storing the loader program.

2. Description of the Prior Art

In recent years, broadcast service business using cable or wireless communication mediums has received much attention in industry. In particular, digital satellite broadcasting and digital CATV (Community Antenna Television System) have captured much of the spotlight for their huge potential for development.

On the other hand, there is a difficulty in maintenance of terminal devices. The terminal devices referred to here are highly intelligent terminals containing various types of software modules, so that the maintenance of the terminal devices includes bug fixing and specification changes for these software modules.

Usually, bug fixing and specification changes are carried out by upgrading the software modules. However, as more and more households use such terminal devices, it becomes increasingly difficult for a broadcast station to upgrade the software modules.

In order to uniformly upgrade software modules in each terminal device, it is necessary for a host station to transmit the new version of the software modules to each terminal device via a communication medium. If a terminal device is a personal computer-type device equipped with a hard disc device and a file system for accessing areas on the hard disc device in units of directories and files, the software upgrade can be achieved by installation. More specifically, the host station first transmits an installer software module and the new version of software modules to each terminal device. In each terminal device, the installer software module creates a new directory on the hard disc and stores the new version (the new version may instead be stored in a directory which stored the old version).

However, in order to be widely distributed at low cost, standard terminal devices used for broadcast services are generally composed of a microcomputer system type which has neither a hard disc device nor a file system. In the microcomputer system type, software modules are directly stored in a memory such as an EEPROM (Electrically Erasable and Programmable ROM which is capable of electrically erasing and rewriting storage contents). Accordingly, it is impossible to access a software module in units of directories and files when upgrading the software module.

In these terminal devices, the software modules stored in the EEPROM or the like are upgraded by remote download.

In general, download is a process of writing data stored in a secondary storage into a primary storage. In a remote download, the primary storage is a memory in each terminal device and the secondary storage is a hard disc device in the host station.

In the remote download process, the host station transmits data in the secondary storage to each terminal device. Each terminal device analyzes the received data and performs error detection and other processing, before writing it into a free area of the primary storage (here, the free area is an area which is not occupied by other software modules).

The above process in the terminal device is performed by a processor executing a loader program which is stored in the EEPROM of the terminal device.

Here, it is not safe for the terminal device to write the new version of the software module received from the host station directly over the old version. If power to the terminal device is cut off during the overwriting, both the new and old versions in the primary storage will be incomplete and inoperable. Thus, it is necessary to save a backup copy of the old version in case of power disconnection during the overwriting.

In order to backup the old version of a software module, it is necessary to copy all software modules stored in the primary storage of the terminal device for the following reason. When a new software module has a memory size larger than its old version, it will be written into not only an area occupied by its old version but also an area occupied by other software modules. Suppose software modules 1–5 which have been written in sequence starting from the first address of the primary storage are to be upgraded. If the new version of software module 1 has a memory size larger than its old version, it will be written not only over its old version but also over software modules 2 and 3. As a result, software modules 2 and 3 will be erased from the primary storage. If power to the terminal device is cut off at this stage, it may not be possible to restart the terminal device.

In order to avoid malfunctions caused by disruptions to the power supply during the remote download, the following two design constraints are given for conventional microcomputer system-type terminal device.

The first design constraint is that a terminal device should be provided with two memory chips which each have a capacity equal to the total size of software modules stored in the terminal device, one memory chip for backup of old software modules and the other memory chip for writing new software modules. By doing so, even when the power is cut off during the writing of the new software modules, the terminal device can be restarted using the backup copy of the old software modules.

The second design constraint is that the loader program for download is not to be upgraded.

FIG. 1 shows an example of a conventional terminal device constructed in accordance with the above constraints. In the figure, the terminal device includes a main EEPROM 81 as a primary storage which stores software modules containing programs and data, an upgrade EEPROM 82, a ROM 83 storing a loader program, and a program execution unit 84 for executing the loader program.

When the terminal device is started, the program execution unit 84 executes the programs stored in the main EEPROM 81 in accordance with a boot program stored in a boot ROM. On receiving new software modules from the host station during the program execution, the program execution unit 84 successively stores them into the upgrade EEPROM 82.

On completing the upgrade, the program execution unit 84 switches to start the new programs stored in the upgrade EEPROM 82. If, on the other hand, the upgrade fails, the program execution unit 84 starts the programs stored in the main EEPROM 81 again and retries the upgrade.

In order to save backup copies of all software modules, each terminal device must be equipped with EEPROMs which are twice as large as the total size of the software modules. Though this is necessary for ensuring that terminal devices can always be started, it causes increases in the hardware scale and the production cost of each terminal device. The total software size included in a conventional terminal device has to be limited in order to suppress production cost, which means that advanced software functioning must be sacrificed.

Also, an extensive process of exchanging a ROM is necessary for each conventional terminal device when bug fixing and specification changes have to be done on the loader program. In such a case, the broadcast company must send its service personnel to each customer to exchange the ROM without charge. The labor cost resulting from such a service places a tremendous burden on the company.

SUMMARY OF THE INVENTION

It is an object of the present invention to provide a terminal device which can execute advanced software without increasing the production cost.

It is another object of the present invention to provide a terminal device in which it is possible to upgrade a loader program.

The above object can be fulfilled by a terminal device that includes: a first memory having n areas which are each given a unique bank address, n being an integer that is no less than 2, wherein each area is composed of an occupied area storing at least one software module and a free area which is used when a data size of the software modules increases as a result of upgrading the software modules; a second memory having a same memory size as each area; a reception unit for receiving transmission data from a host station, wherein the transmission data includes a content part and a header part, wherein the content part includes at least one new software module corresponding to at least one software module stored in any of the n areas, and the header part includes a target bank address specifying an area into which the new software modules are to be stored, wherein each new software module is new to the terminal device, that is, each new software module has more recent version information than a corresponding software module stored in any of the n areas; a separation unit for separating the header part from the transmission data and storing the content part which includes the new software modules into the second memory; a detection unit for detecting the target bank address from the header part; and a write unit for writing the new software modules stored in the second memory into the area specified by the detected target bank address.

With the stated construction, memory is divided into a plurality of areas to store software which is upgraded one area at a time. By doing so, a memory with the same size as one area is only needed as the temporary storage used when performing an upgrade. The terminal device only needs a memory that is "1+1/n" times as large as the total software when there are n areas, while a conventional terminal device needs a memory that is twice as large as the total software.

It is possible to reduce a scale of hardware that can withstand errors that occur during software upgrades. As a result, advanced software can be installed in the terminal device without increasing the production cost.

Also, it is possible to safely upgrade software modules in a short period of time by writing the new software modules into an appropriate area without a danger of overwriting software modules in other areas.

Here, among the n areas, a first area and a second area may respectively store a master loader program and a backup loader program, and wherein the write unit includes: a first write control unit for writing, when the detected target bank address specifies an area other than the first area, the new software modules stored in the second memory into the area other than the first area according to the master loader program in the first area; and a second write control unit for writing, when the detected target bank address specifies the first area, the new software modules stored in the second memory into the first area according to the backup loader program in the second area.

With the stated construction, two loader programs are stored in different areas, so that a loader program can be upgraded by writing the new loader program over one loader program while executing the other loader program. Bug fixing and specification changes for the loader program can be conducted easily by upgrading the loader program in the above way without exchanging ROMs that incurs a great labor cost to the broadcast company.

Here, a first area, among the n areas, may store a master loader program, wherein the write unit includes: a first write control unit for writing, when the detected target bank address specifies an area other than the first area, the new software modules stored in the second memory into the area other than the first area according to the master loader program in the first area; a second write control unit for writing, when the detected target bank address specifies the first area, the new software modules stored in the second memory into a second area which is different from the first area according to the master loader program in the first area; a monitor unit for monitoring, after the new software modules are written into the second area, whether the second memory stores at least one new software module corresponding to at least one software module which was previously stored in the second area; and a third write control unit for writing, when the second memory stores the new software modules corresponding to the software modules which were previously stored in the second area, the new software modules stored in the second memory into the first area according to a new master loader program included in the new software modules written in the second area.

With the stated construction, the loader program can be upgraded without using the backup loader program by writing the new software modules for the first area into another area. By using only the master loader program, more software modules can be stored in place of the backup loader program.

Here, the content part may include a plurality of new software modules, and the header part may include a plurality of target bank addresses which each specify an area into which each new software module in the content part is to be stored, wherein the terminal device further includes a third memory having the same memory size as each area, and wherein the write unit includes: a retrieval unit for retrieving one of the plurality of new software modules in the content part from the second memory; a first write control unit for writing all software modules stored in an area specified by a detected target bank address for the retrieved new software module into the third memory; a replacement unit for replacing a software module, out of the software modules stored in the third memory, which corresponds to the retrieved new software module with the retrieved new software module; a second write control unit for writing the software modules after a replacement by the replacement unit from the third memory into the area specified by the detected target bank address; and a retrieval control unit for having the retrieval unit retrieve another new software module, out of the plurality of new software modules, from the second memory after a write by the second write control unit.

With the stated construction, the terminal device receives the new version of software modules to be upgraded from the host station and replaces each software module. As a result, the upgrade processing can be completed faster than the upgrade processing performed by replacing software modules in area units.

BRIEF DESCRIPTION OF THE DRAWINGS

These and other objects, advantages and features of the invention will become apparent from the following description thereof taken in conjunction with the accompanying drawings that illustrate a specific embodiment of the invention. In the drawings:

FIG. 11 is a flowchart showing the loader program processing of the third embodiment;

DESCRIPTION OF THE PREFERRED EMBODIMENTS

First Embodiment

The following is an explanation of a terminal device of the present invention with reference to the figures.

Here, a terminal device 10 is provided to each household which is a subscriber of a broadcast service A. The broadcast service A broadcasts a variety of TV programs such as movies, dramas, sports, and educational programs via satellite. This broadcast service A can provide more channels and a higher picture quality than broadcast services that use ground waves. The terminal device 10 is equipped with various intelligent functions, in addition to a tuner and a decoder for displaying the programs on a TV receiver. The intelligent functions include display of weekly and monthly electric program guides (EPG), display of headline news, invoicing, on-line quizzes, TV shopping, games, and karaoke, with the emphasis on user interaction.

Figure 1:
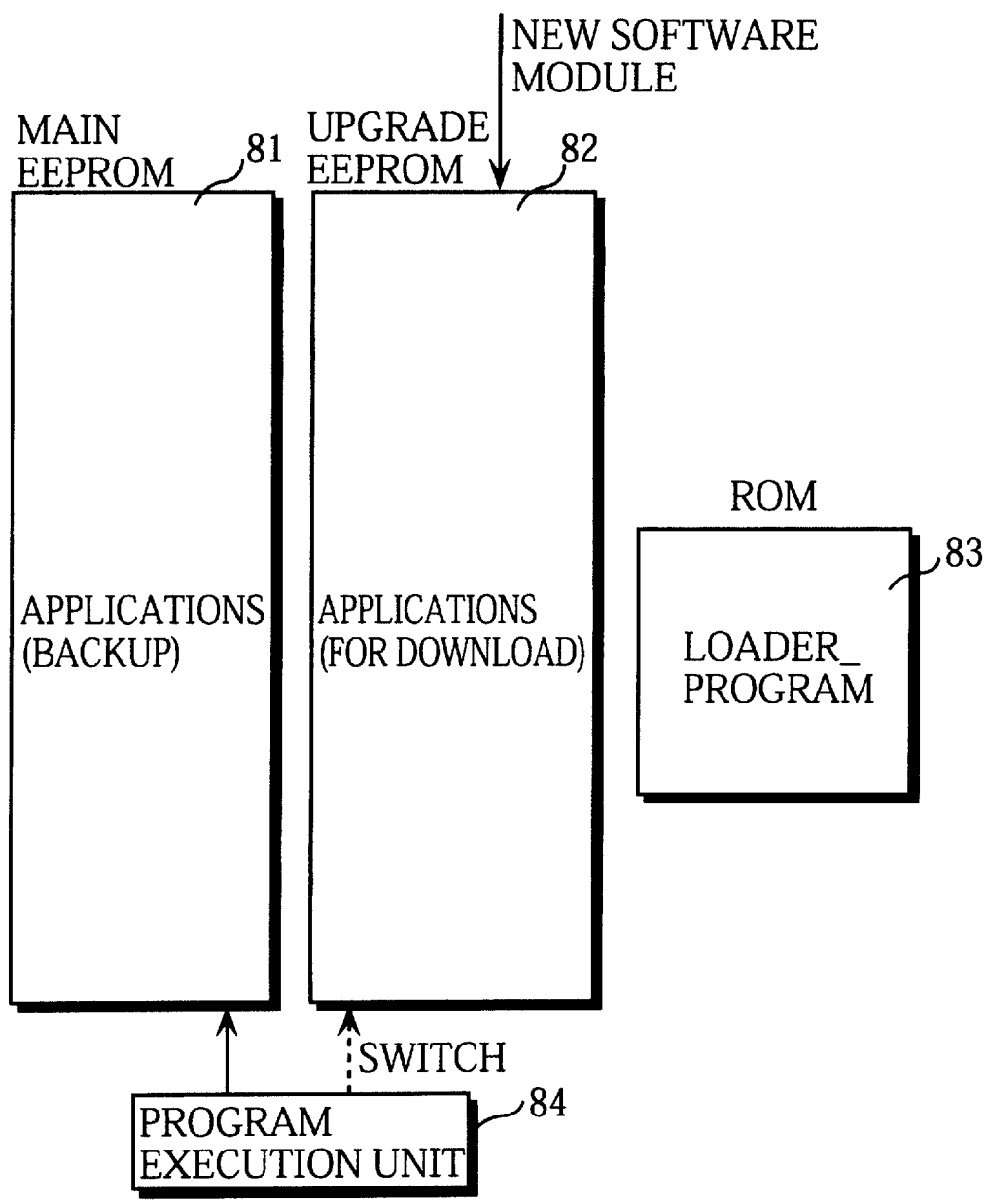
FIG. 1 shows the construction of a conventional terminal device.
Figure 2:
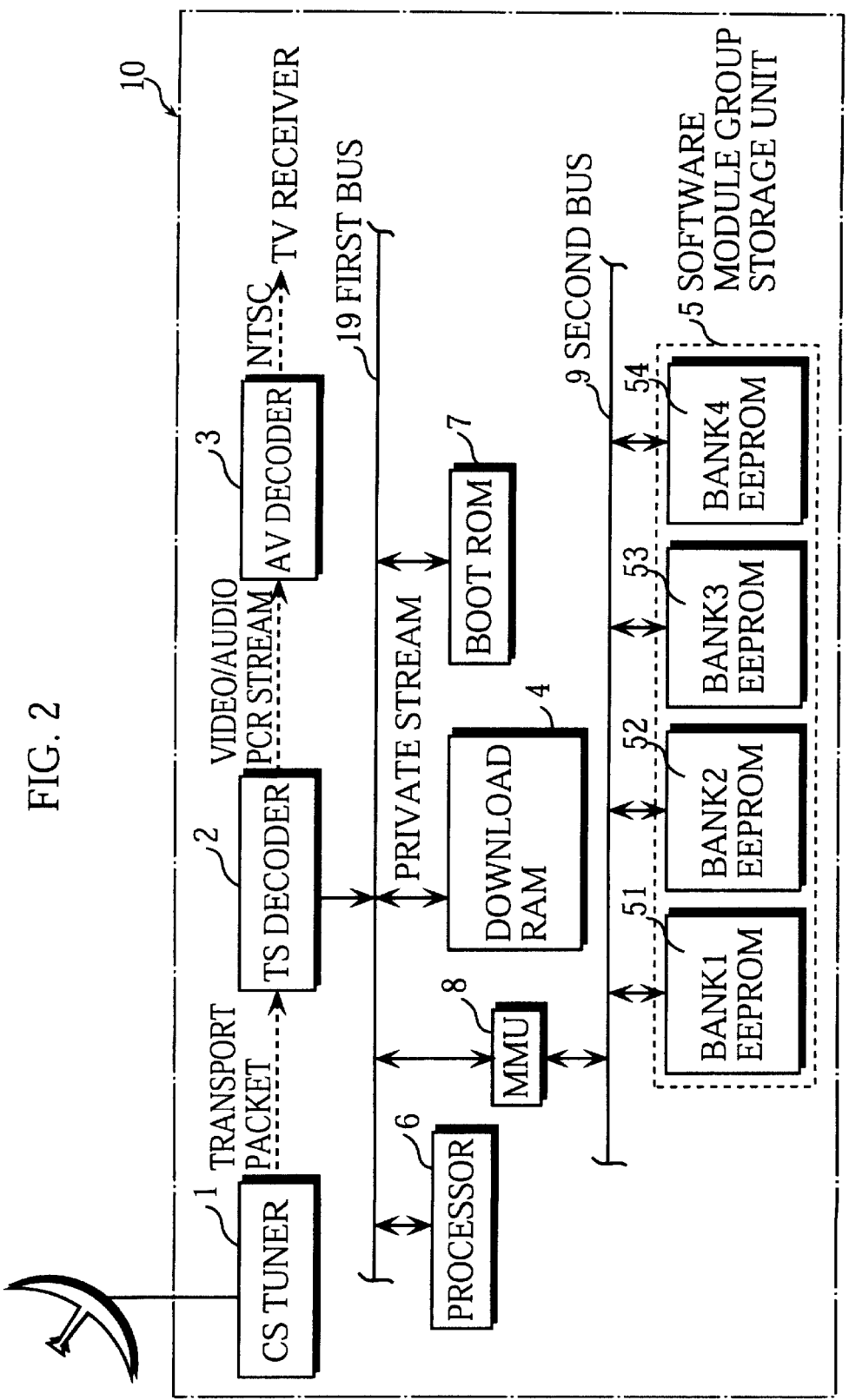
FIG. 2 shows the construction of the terminal device 10 in the remote download system of the first and second embodiments.

FIG. 2 shows the construction of the terminal device 10. In the figure, the terminal device 10 includes a CS tuner 1, a TS decoder 2, an AV decoder 3, a download RAM 4, a software module group storage unit 5, a processor 6, and a boot ROM 7. The device is connected to a TV receiver and a video deck in each household.

When a CS antenna receives a π/4QPSK (Quadrature Phase Shift Keying)-modulated broadcast wave, the CS tuner 1 demodulates it and outputs the resulting transport packet that conforms to MPEG2 (Moving Picture Expert Group 2) Standard to the TS decoder 2.

The TS decoder 2 separates the transport packet into four elementary streams which are a video stream, an audio stream, a PCR (Program Clock Reference) stream, and a private stream. The video stream, the audio stream, and the PCR stream which compose a TV program are outputted to the AV decoder 3, while the private stream which is used for maintenance of the intelligent functions is stored into the download RAM 4.

Figure 3A:
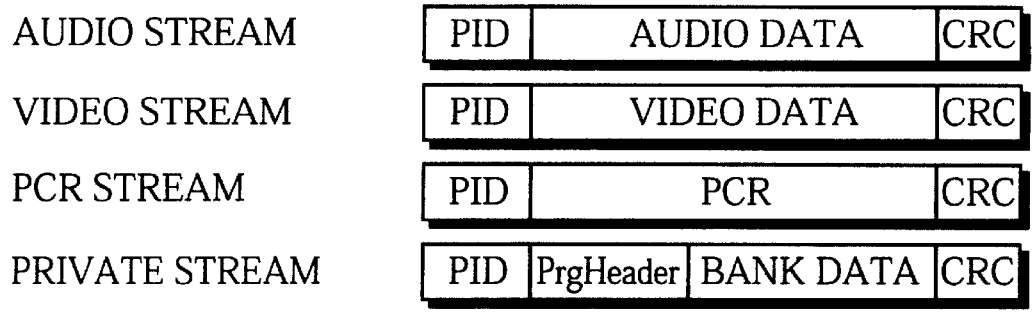
FIG. 3A shows the construction of elementary streams decoded by the TS decoder 2.

FIG. 3A shows the construction of four elementary streams. The video stream is composed of a PID (Packet Identification), video data, and a CRC (Cyclic Redundancy Check Code). The audio stream is composed of a PID, audio data, and a CRC. The PCR stream is composed of a PID, PCR data, and a CRC. The private stream is composed of a PID, a program header (PrgHeader in FIG. 3A), bank data, and a CRC. Each PID is used by the TS decoder 2 for judging whether the elementary stream is to be outputted to the AV decoder 3 or the download RAM 4.

The bank data is a software module group which is transmitted from the broadcast station and which is to be stored into the same bank. In the present embodiment, a bank is a divided area in the memory of the terminal device.

Figure 3B:
FIG. 3B shows the construction of a program header.

One example of the program header included in the private stream is shown in FIG. 3B. In the figure, "program name" shows a bank data name, "data size" shows a bank data size, "bank number" shows a bank address into which the bank data is to be stored, and "version information" shows a production date or a most recent renewal date of the bank data.

The AV decoder 3 decodes the video and audio streams into image signals using the PCR stream and outputs the image signals to the TV receiver.

The download RAM 4 is a SIMM (Single In-Line Memory Module)-type DRAM (Dynamic RAM) or EEPROM for storing the private stream transmitted from the TS decoder 2.

The software module group storage unit 5 is composed of n banks which store a plurality of software modules (in FIG. 2, the n banks are four banks 1–4). Each bank is an EEPROM chip (hereinafter, EEPROMs 51–54) and has a storage capacity about the same as the download RAM 4. Software modules stored in the software module group storage unit 5 are a plurality of types of software modules including data and programs which have been uniformly modularized.

The EEPROMs 51–54 are connected to a second bus 9. A logical address is assigned to each internal storage area in each EEPROM so that the processor 6 can directly access the internal storage areas. Each logical address is expressed as a combination of a bank address which is assigned to each bank and an offset address which specifies an internal storage area in each bank.

Figure 5A:
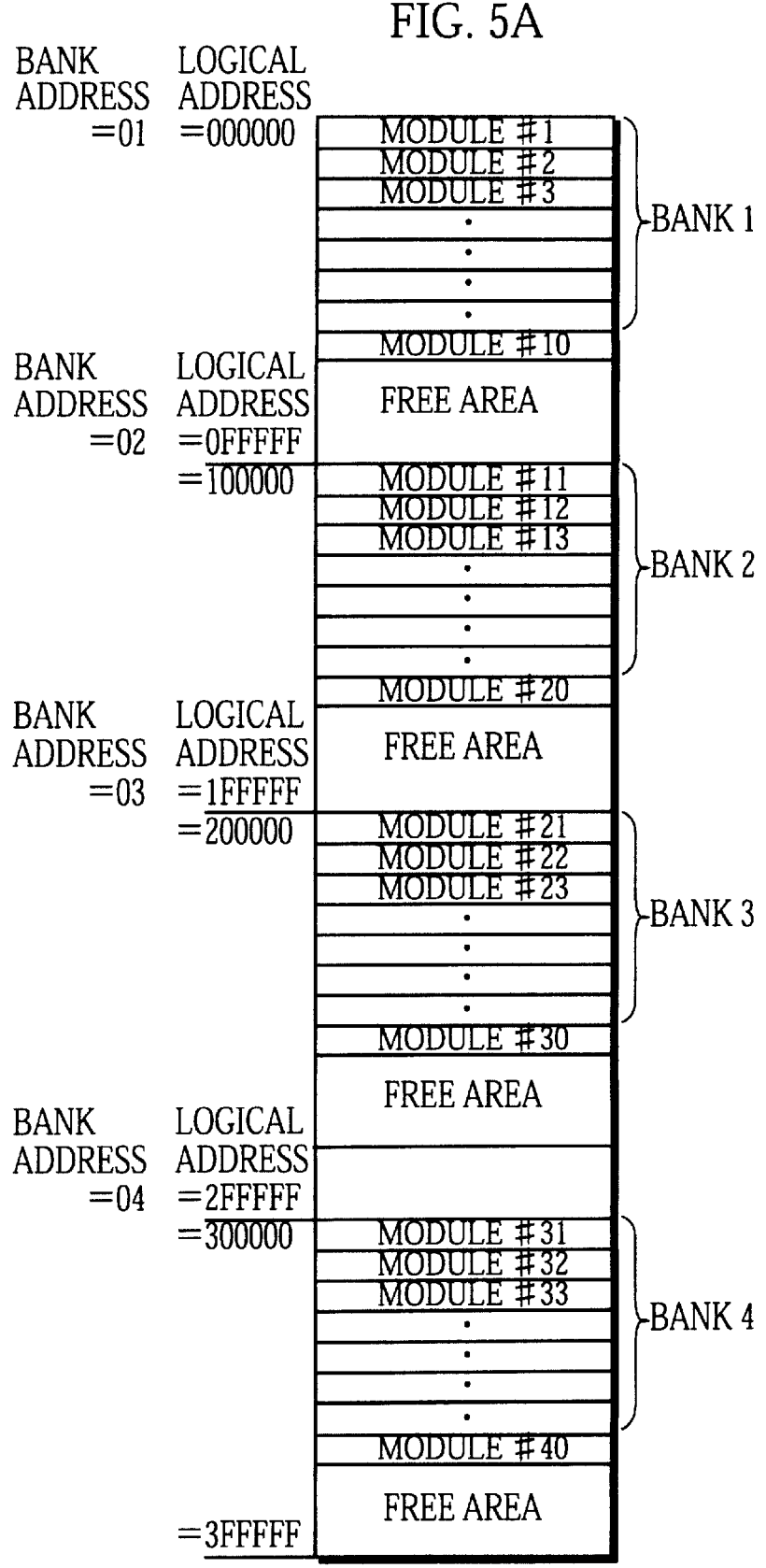
FIGS. 5A and 5B show which software modules are stored in each bank.

FIG. 5A shows a memory image of the EEPROMs 51–54. In the figure, logical addresses 000000 to 0FFFFF correspond to a bank address 01, while logical addresses 100000 to 1FFFFF correspond to a bank address 02.

Bank 1 stores software modules 1–10, while bank 2 stores software modules 11–20. The software modules are consecutively stored from the top of each bank so that a free area is left at the bottom. This free area is used when upgrading the software modules in each bank. For example, when, during an upgrade of software modules 1–10 in bank 1, the new version has a larger size than the old version, the new version is written into the area occupied by the old version of software modules 1–10 and the free area but not into the area occupied by software modules 11–20 in bank 2.

Thus, the software modules in each bank can be upgraded without overwriting software modules in the next bank by using the free area.

Figure 4A:
FIG. 4A shows the construction of a software module.

FIG. 4A shows an example of a software module format.

The software module is composed of a module header, an entity unit, and a CRC.

Figure 4B:
FIG. 4B shows the construction of a module header.

FIG. 4B shows an example of the module header. The module header is composed of "program name", "data size", "bank number", and "version information". "Program name" shows a software module name, "data size" shows a software module size, "bank number" shows a bank address into which the software module is to be stored, and "version information" shows a production date or a most recent renewal date of the software module. It should be noted that the bank data is composed of a plurality of software modules which are to be stored in the same bank, each software module having the format shown in FIG. 4A.

In the present embodiment, each software module needs to be "relocatable", that is, the software module can be executed regardless of where it is stored in the software module group storage unit 5. This is because it is more desirable for the broadcast company that a location of each software module in the software module group storage unit 5 be changeable.

Each software module is categorized either as an operating system component or an application program. This means that the terminal device 10 has a software management construction similar to a standard computer in which each application program is operated based on the operating system.

Figure 5B:
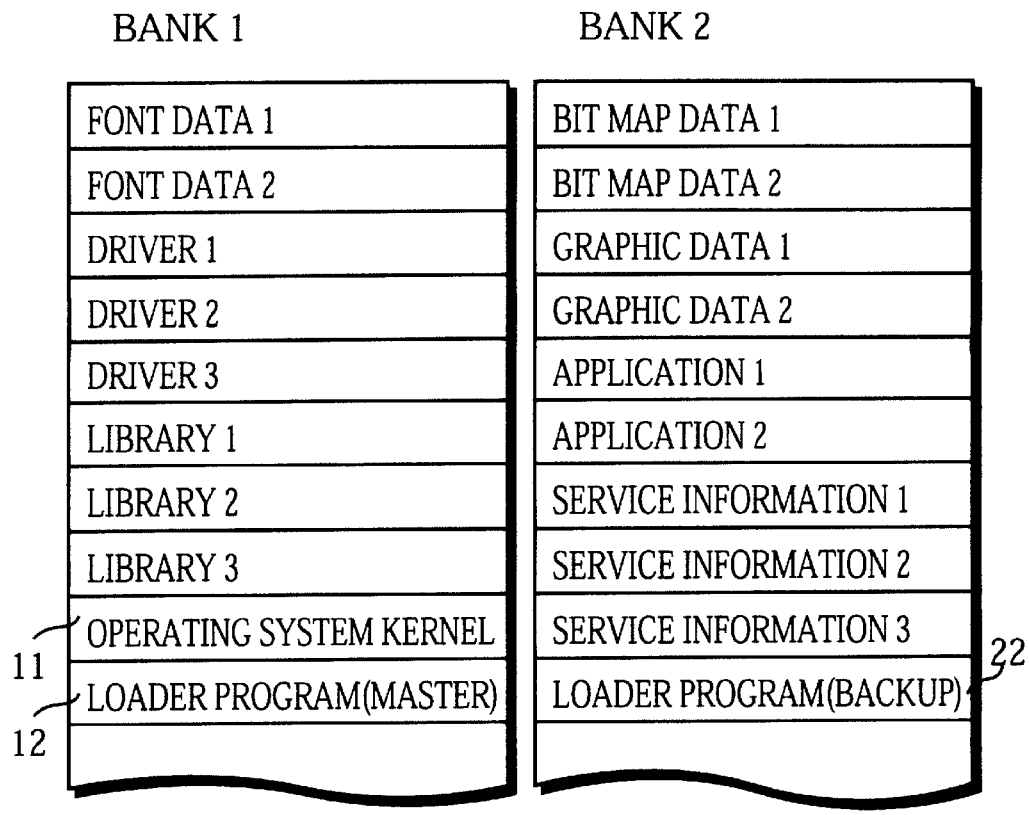

FIG. 5B shows which software modules are stored in banks 1 and 2 of the software module group storage unit 5. As shown in the figure, the software module group storage unit 5 stores a variety of software modules including font data, bitmap data, and graphic data. Main software modules which make up the operating system are a kernel 11, a loader program 12, and a loader program 22.

The kernel 11 is a software module for executing the fundamental processing for the intelligent functions of the terminal device 10. This processing includes checking each software module after the terminal device is switched on and starting a loader program.

The loader program 12 is a master loader program stored in bank 1. In the present embodiment, the loader program is used by the processor 6 for starting the application programs stored in the software module group storage unit 5 and for upgrading the software modules by download.

The main download processing of the loader program 12 includes error detection and defragmentation.

Error detection is a process of detecting garbled bank data in the private stream using the CRC or the like. Bank data which is judged to be normal as a result of the error detection is stored into a target bank (a bank into which the bank data is to be stored). On the other hand, for bank data in which an error is detected, the processor 6 retries to receive the bank data from the broadcast station according to the master loader program 12. If the digital satellite broadcast station transmits the same private stream in a predetermined cycle, the processor 6 receives the private stream and performs the error detection again.

Defragmentation is composed of the following two processes. First, when new software modules that are larger than the corresponding old software modules cannot be contained within an area occupied by the old software modules, other software modules which have been written in the memory are relocated so as to generate a free area sufficient for writing the new software modules. Second, when a free area is left after writing new software modules that are smaller than the corresponding old software modules into an area occupied by the old software modules, other software modules which have been written in the memory are relocated so as to eliminate the free area.

The above processes have to be performed each time the terminal device 10 receives bank data. Accordingly, the download processing of the master loader program 12 usually requires a considerable amount of time.

The backup loader program 22 is stored in a different bank (bank 2) from the master loader program 12 and has the same download processing as the master loader program 12.

The processor 6 includes a program counter for specifying a read address in the software module group storage unit 5, a reading circuit for reading a machine instruction of a software module which is located at the read address, a decoder for decoding the read instruction, and an arithmetic unit for performing an arithmetic operation according to the decoded instruction. The processor 6 accesses the download RAM 4 and the boot ROM 7 which are connected to a first bus 19 and executes the application programs in the software module group storage unit 5.

The boot ROM 7 stores a boot program which is used by the processor 6 to perform a bootstrap when the terminal device 10 is switched on.

A MMU (Memory Management Unit) 8 associates each actual address in the EEPROMs 51–54 with a respective logical address. When the processor 6 outputs a read address to the first bus 19, the MMU 8 interprets the read address as a logical address and outputs an actual address corresponding to the logical address to the second bus 9. The MMU 8 is located between the first bus 19 and the software module group storage unit 5 so that the EEPROMs 51–54 are given a linear address space which is accessible by the processor 6.

Figure 8:
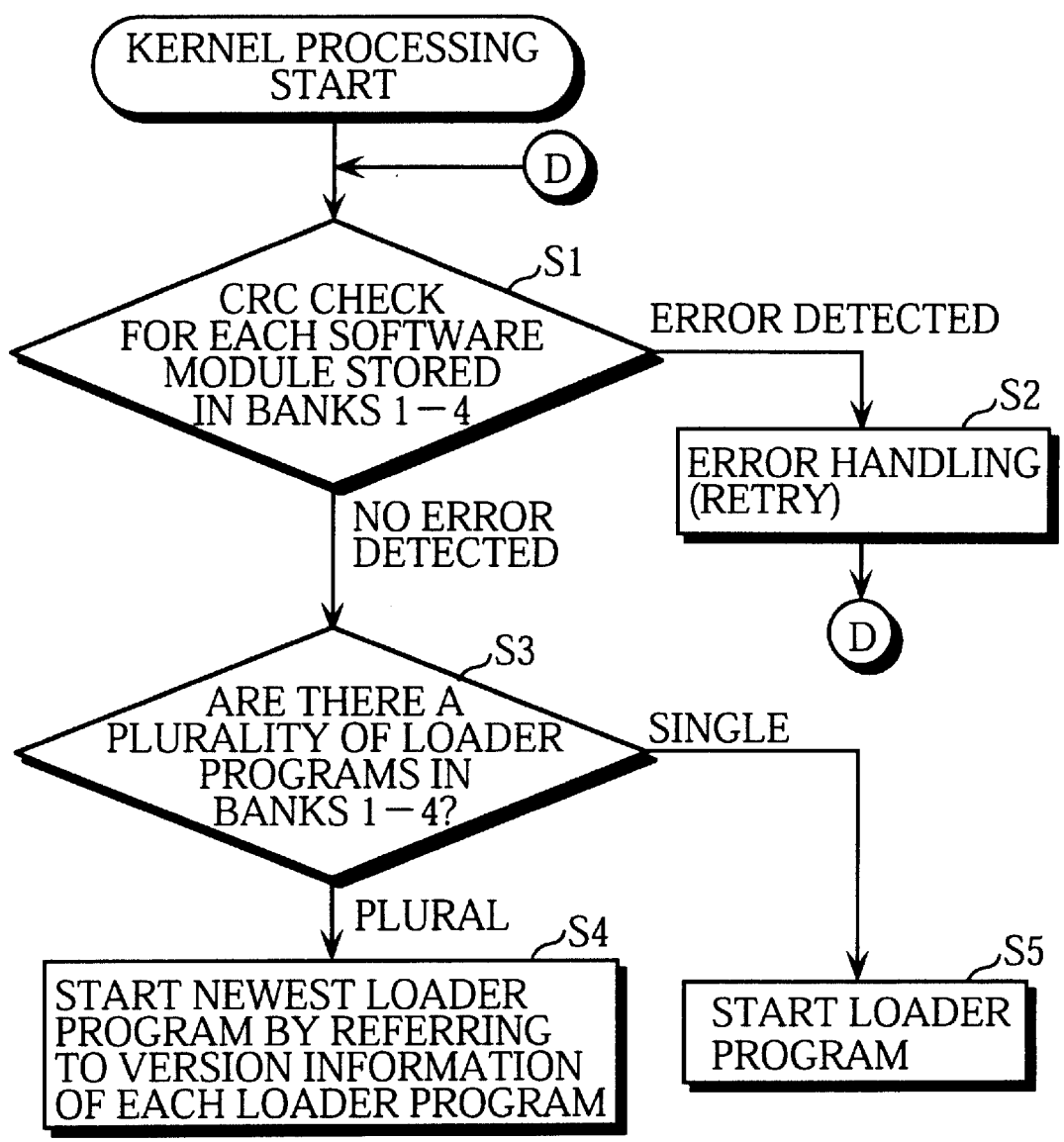
FIG. 8 is a flowchart showing the kernel processing of the first embodiment.
Figure 9:
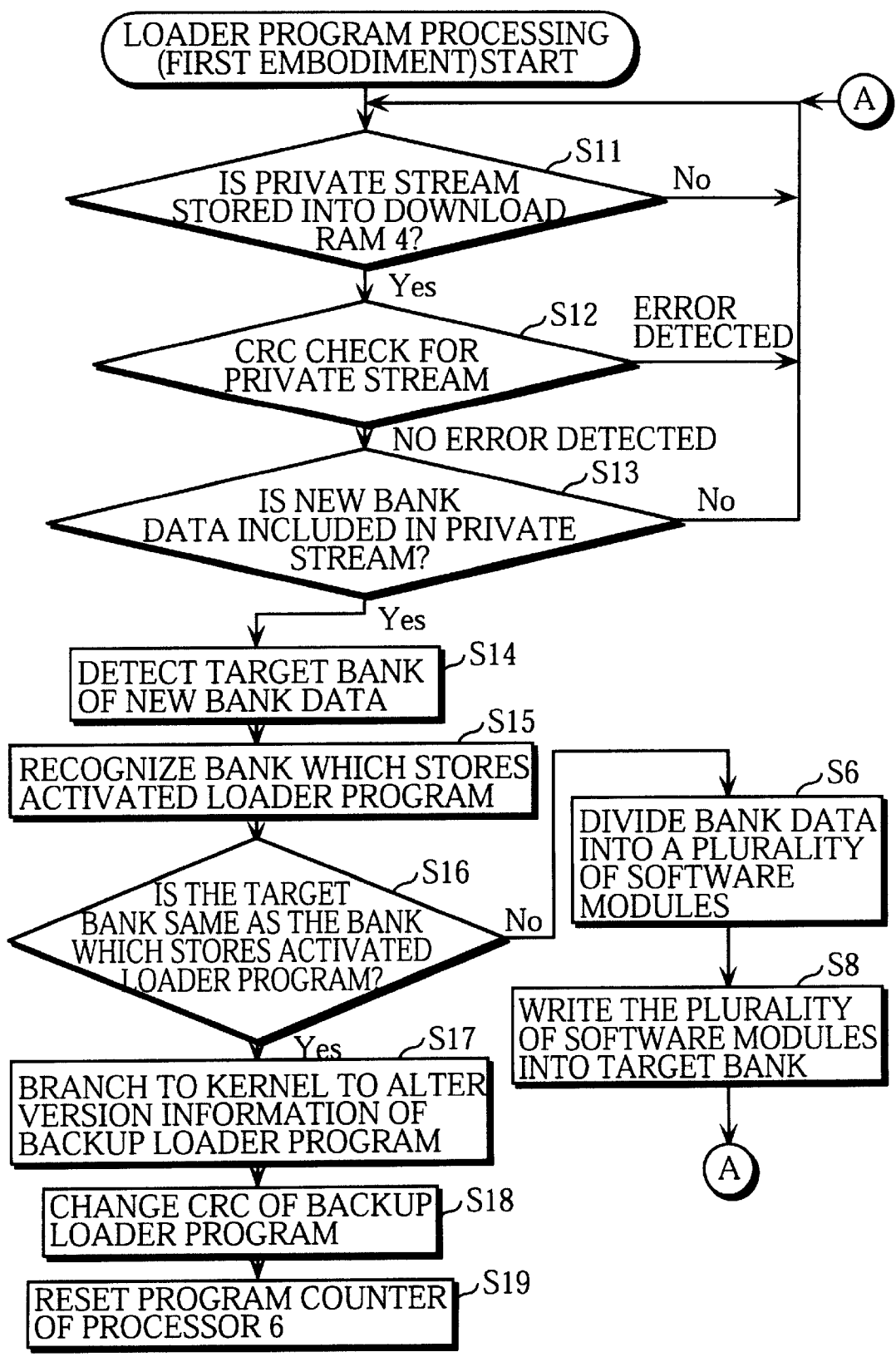
FIG. 9 is a flowchart showing the loader program processing of the first embodiment.

FIGS. 8 and 9 are flowcharts showing the processing of the kernel 11 after the terminal device 10 is switched on and the download processing of the loader program.

When the terminal device 10 is switched on, the CS tuner 1 demodulates a π/4QPSK-modulated digital satellite broadcast wave and outputs the resulting transport packet that conforms to MPEG2 Standard to the TS decoder 2. The TS decoder 2 separates the received transport packet into a video stream, an audio stream, a PCR stream, and a private stream. The AV decoder 3 decodes the video and audio streams into image signals using the PCR stream and outputs the image signals to the TV receiver. As a result, users can enjoy a variety of TV programs such as movies, dramas, sports, and educational programs displayed on the TV receiver.

Meanwhile, the program counter in the processor 6 is set at a first address of the boot ROM 7. The processor performs the bootstrap according to the boot program stored in the boot ROM 7. The program counter in the processor 6 is then set at a first step of the kernel processing shown in FIG. 8.

First, the processor 6 checks a CRC of each software module stored in banks 1–4 (Step S1). If an error is detected, appropriate error handling such as a retry of reading software modules is conducted (Step S2). When no error is detected, the processor 6 judges whether there are a plurality of loader programs (Step S3). If there is only one loader program, the processor 6 starts the loader program (Step S5). If, on the other hand, there are two or more loader programs, such as the loader programs 12 and 22, the processor 6 refers to version information of each loader program and starts the newest loader program (Step S4).

For the example in FIG. 5A, when the master loader program 12 is newer than the backup loader program 22, the program counter of the processor 6 is set at a first address of the master loader program 12, and the processor 6 branches from the kernel 11 to the master loader program 12.

The processor 6 starts a variety of application programs by sequentially executing the master loader program 12. Meanwhile, the processor 6 starts the download processing shown in FIG. 9.

Figure 12A:
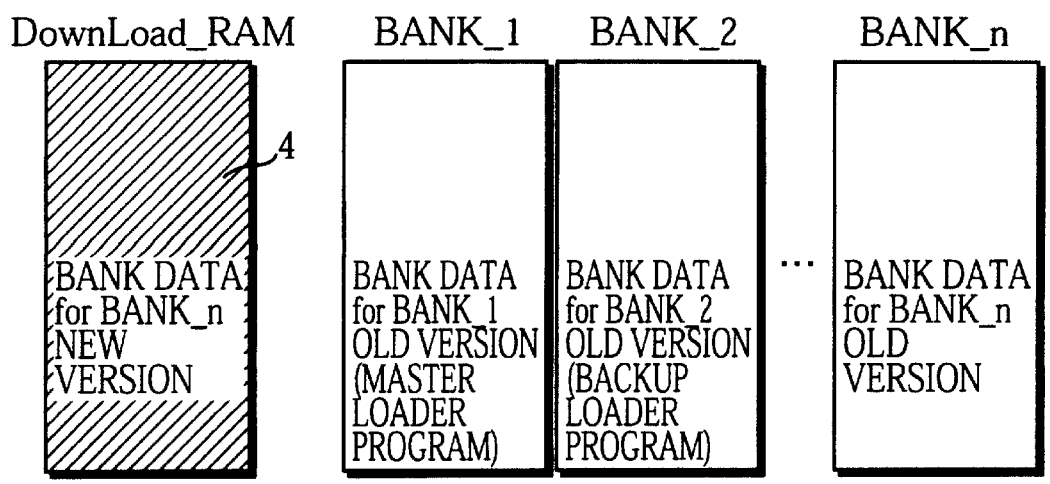
FIGS. 12A and 12B show how bank data for bank n is stored into a ROM according to a loader program of the first embodiment.

The processor 6 judges whether a private stream has been newly stored into the download RAM 4 (Step S11). Step S11 is 5 repeated until a private stream is stored into the download RAM 4. When bank data for bank n is stored into the download RAM 4 as shown in FIG. 12A (a crosshatched area in the figure), the processor 6 checks a CRC of the private stream (Step S12). If an error is detected, the processing returns to Step S11. If no error is detected, the processor 6 judges whether new bank data (hereinafter the term "new" means new to the terminal device 10, which is to say, the downloaded version has more recent version information than the version in the software module group storage unit 5) is included in the private stream by referring to version information in a program header of the private stream (Step S13).

On judging that the new bank data is included, the processor 6 detects a target bank into which the new bank data is to be stored by referring to a bank number in the program header of the private stream (Step S14). On detecting the target bank, the processor 6 recognizes a bank address in which the activated loader program is stored (Step S15). The processor 6 then judges whether the target bank is the same as the bank which stores the activated loader program (Step S16).

When they are not the same, as shown in FIG. 12A where the master loader program 12 is stored in bank 1 while the target bank of the new bank data is bank n, the processing proceeds to Step S6. The processor 6 divides the new bank data into a plurality of software modules (Step S6) and writes them into bank n (Step S8).

Figure 12B:
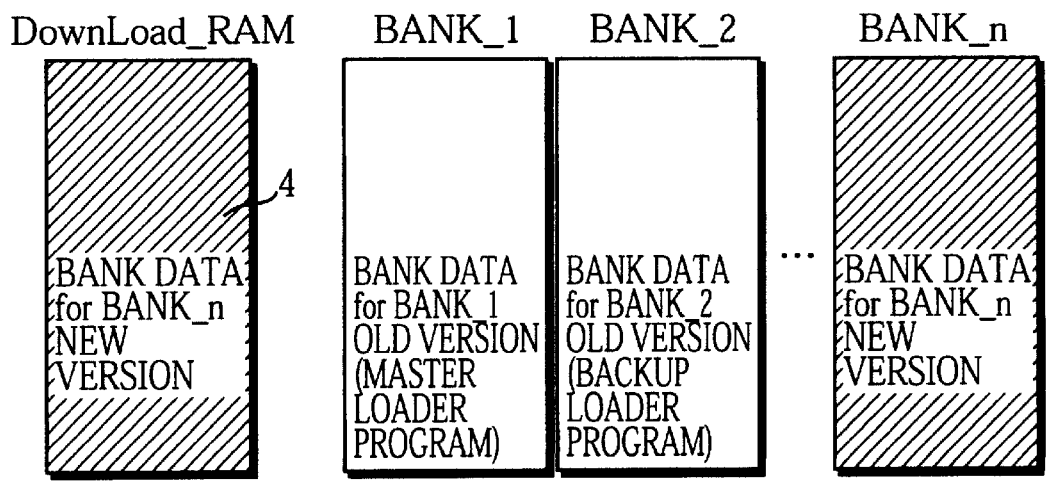

In Step S8, the new software modules are simply written into the bank without conducting error detection and defragmentation, so that the write processing requires only a short period of time. Since there is a low probability of the power being cut off during such a short period, the upgrade of the bank data stored in bank n is successfully completed as shown in FIG. 12B.

Figure 13A:
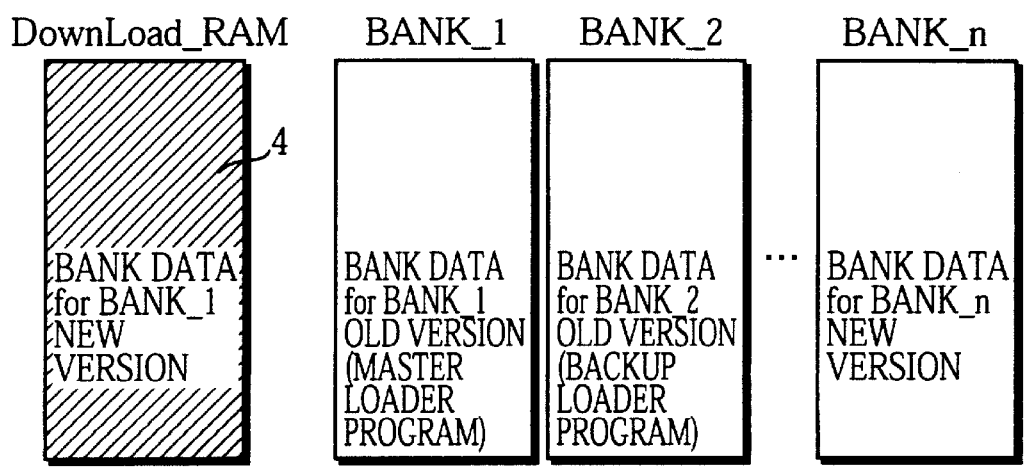
FIGS. 13A–13C show how bank data for bank 1 is stored into the ROM according to the loader program of the first embodiment.

After upgrading the bank data of bank n, another private stream including bank data for bank 1 is stored into the download RAM 4 as shown in FIG. 13A. The processor 6 chooses "Yes" in Step S11 and proceeds to Step S12. The processor 6 checks a CRC of the private stream (Step S12), judges whether the private stream includes the new bank data (Step S13), and detects that a target bank of the bank data is bank 1 by referring to a bank number in the program header of the private stream (Step S14), before detecting the bank which stores the activated loader program (Step S15).

The processor 6 judges whether the target bank is the same as the bank which stores the activated loader program (Step S16). Here, both the target bank and the bank which stores the activated loader program are bank 1. Accordingly, the processor 6 chooses "Yes" in Step S16 and branches to the kernel 11 in order to alter the version information of the backup loader program 22 (Step S17). After altering a date shown in version information of the backup loader program 22 stored in bank 2 to a more recent date according to the kernel 11, the processor 6 returns to the loader program processing. The processor 6 changes a CRC of the backup loader program 22 in response to the altered version information (Step S18). Then the program counter of the processor 6 is reset (Step S19).

Figure 13B:
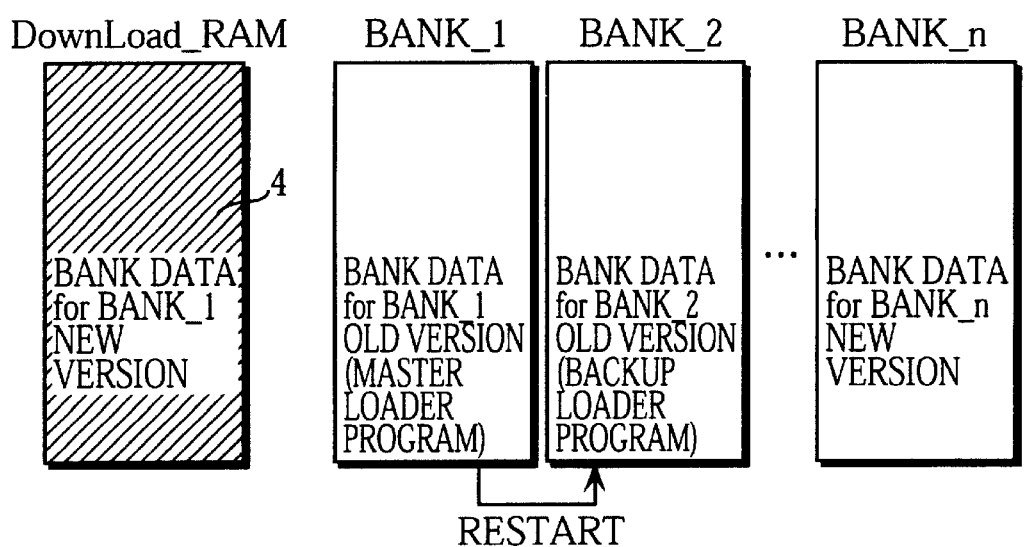

As a result of the above processing, a loader program to be started by the processor 6 next time becomes the backup loader program 22 stored in bank 2 and not the master loader program 12. That is to say, when the terminal device 10 is started after resetting the program counter of the processor 6, the loader program with the newest version information is selected in the kernel processing as shown in FIG. 13B (see Step S4 in FIG. 8).

The following is an explanation of the processing when the processor 6 executes the backup loader program 22. The program counter of the processor 6 is reset at the first address of the boot ROM 7. After performing the bootstrap according to the boot program stored in the boot ROM 7, the processor 6 checks a CRC of each software module in banks 1–4 (Step S1). When no error is detected, the processor 6 judges whether there are a plurality of loader programs (Step S3) and starts a loader program with the newest version information (Step S4). Here, when comparing the version information of the loader programs 12 and 22, the backup loader program 22 has the newer version information as a result of the alteration, so that the program counter of the processor 6 is set at a first address of the backup loader program 22. The processor 6 then switches the processing from the kernel 11 to the backup loader program 22.

The processor 6 starts a variety of application programs by sequentially executing the backup loader program 22. Meanwhile, the processor 6 starts the download processing shown in FIG. 9.

The processor 6 judges whether a private stream is newly stored into the download RAM 4 (Step S11). Here, the bank data for bank 1 has already been stored in the download RAM 4 as shown in FIG. 13B (a crosshatched area in the figure). Accordingly, the processor 6 checks a CRC of the private stream (Step S12), judges whether the new bank data is included in the private stream (Step S13), and detects a target bank of the new bank data by referring to a bank number in the program header of the private stream (Step S14). On detecting the target bank, the processor 6 recognizes a bank in which the activated loader program is stored (Step S15). The processor 6 then judges whether the target bank is the same as the bank which stores the activated loader program (Step S16).

Figure 13C:
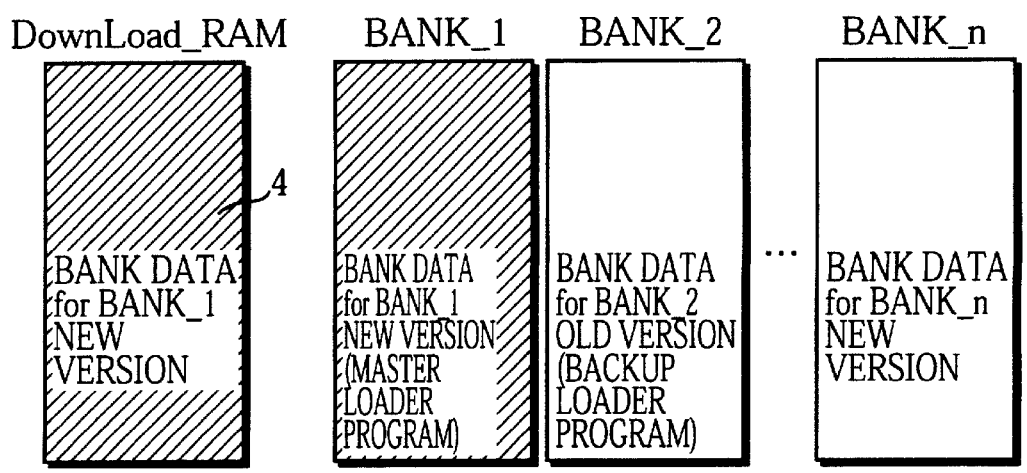

Here, since the activated loader program is the backup loader program 22 stored in bank 2 while the target bank is bank 1, the processor 6 proceeds to Step S6. The processor 6 divides the new bank data into a plurality of software modules (Step S6) and writes them into bank 1 (Step S8). As a result, the bank data stored in bank 1 is upgraded as shown in FIG. 13C. The master loader program 12 included in the bank data in bank 1 is also upgraded.

In the present embodiment, software modules are stored and upgraded in each of a plurality of banks, so that a RAM with a memory size same as one bank is sufficient as a buffer for downloaded bank data. It is possible to reduce a scale of hardware that can withstand errors that occur during software upgrades. As a result, advanced software can be installed in the terminal device without increasing the production cost.

Also, by storing a master loader program and a backup loader program in different banks, it is possible to upgrade one loader program while executing the other loader program. As a result, bug fixing and specification changes for the loader program can be conducted easily by upgrading the loader program in the above way without exchanging ROMs that incurs a great labor cost to the broadcast company.

It is not desirable to frequently upgrade bank data of the bank which stores the master loader program, since the upgrade of the master loader program requires the extensive processing of starting the backup loader program stored in a different bank. Accordingly, it is preferable to store software modules which have to be frequently upgraded in banks other than the bank which stores the master loader program. In particular, software modules relating to MPEG stream decoding and software modules for displaying weekly and monthly electric program guides need to be frequently upgraded and so are preferably stored in banks other than the bank storing the master loader program.

In the present embodiment, a target bank of each software module is determined by a bank number in a module header of the software module, while a target bank may be changed based on upgrade frequency of each software module.

Second Embodiment

In the second embodiment, a loader bank (a bank which stores the master loader program) is upgraded without using a backup loader program so as to improve the efficiency of the ROM use. By using only a master loader program, more software modules can be stored in an area which was occupied by the backup loader program in the first embodiment.

There is one prerequisite for upgrading the loader program in the second embodiment. The prerequisite is that banks other than the loader bank should include one recoverable bank. A recoverable bank means a bank that stores data which can be recovered even if damaged, either because bank data of the recoverable bank is repeatedly transmitted from the host station at regular intervals or because the terminal device instructs the host station to transmit the bank data by sending a request signal.

Figure 10:
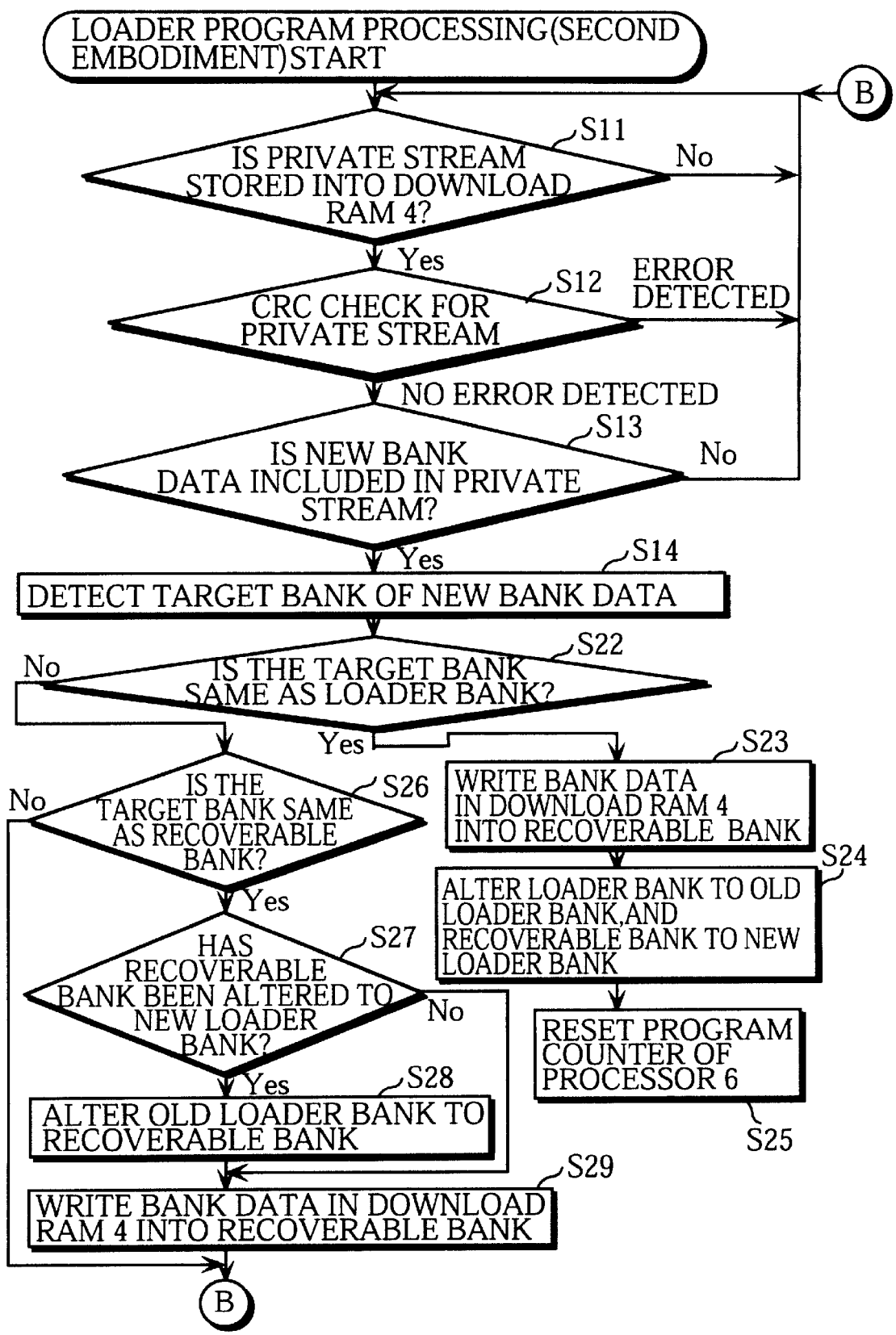
FIG. 10 is a flowchart showing the loader program processing of the second embodiment.
Figure 14A:
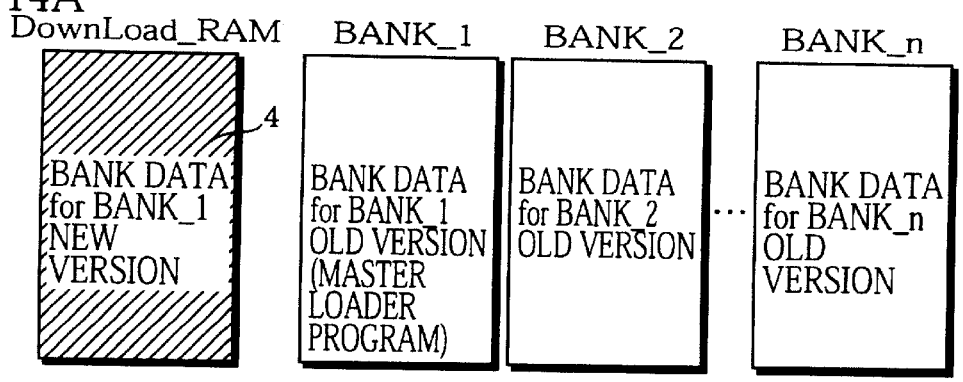
FIGS. 14A–14D show how bank data for bank 1 is stored into the ROM according to a loader program of the second embodiment.

FIG. 10 is a flowchart showing the processing of the loader program in the second embodiment. The terminal device 10 of the second embodiment is constructed in such a way as to upgrade the master loader program without using a backup loader program. The following is an explanation of the loader program upgrade processing with reference to FIGS. 10 and 14A–14D. FIG. 14A shows an initial state of the processing. Here, the loader bank is bank 1, while the recoverable bank is bank 2. The new bank data for bank 1 is stored in the download RAM 4.

First, the processor 6 performs the same processing as Steps S11–S14 in FIG. 9. In Step S11, the processor 6 judges whether a private stream is newly stored into the download RAM 4. If so, the processor 6 checks a CRC of the private stream (Step S12), judges whether the private stream includes new bank data (Step S13), and detects a target bank of the new bank data (Step S14). Next, the processor 6 judges whether the target bank of the new bank data is the loader bank (Step S22).

When the target bank is the loader bank, the processor 6 writes the new bank data not into bank 1 which is the loader bank but into bank 2 which is the recoverable bank (Step S23). Here, the processor 6 performs the same write processing as Steps S6–S8 in FIG. 9. The processor 6 divides the bank data into a plurality of software modules (Step S6) and writes them into the recoverable bank (Step S8).

On writing the bank data into the recoverable bank, the processor 6 alters the loader bank to the old loader bank, and the recoverable bank to the new loader bank (Step S24).

Figure 14B:
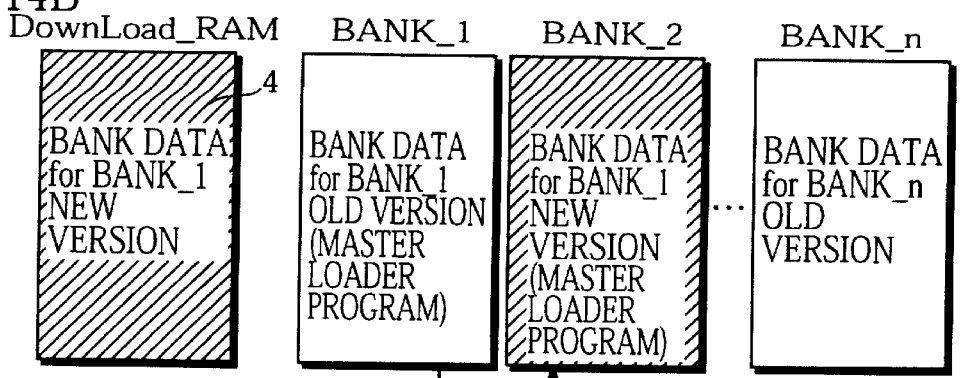

FIG. 14B shows a state after completing Step S24 in the loader program upgrade processing. In the figure, the old loader bank data and the new loader bank data are respectively stored in the banks 1 and 2. Then the program counter of the processor 6 is reset (Step S25).

As a result of the above processing, a loader program to be started by the processor 6 next time becomes the new loader program stored in the new loader bank. That is to say, when the terminal device 10 is restarted after resetting the program counter of the processor 6, the new loader program in the new loader bank is selected in the kernel processing as shown in FIG. 14B (see Step S4 in FIG. 8).

On starting the new loader program in the new loader bank, the processor 6 performs the same processing as Steps S11–S14 in FIG. 9. In Step S11, the processor 6 judges whether a private stream is newly stored into the download RAM 4.

Figure 14C:
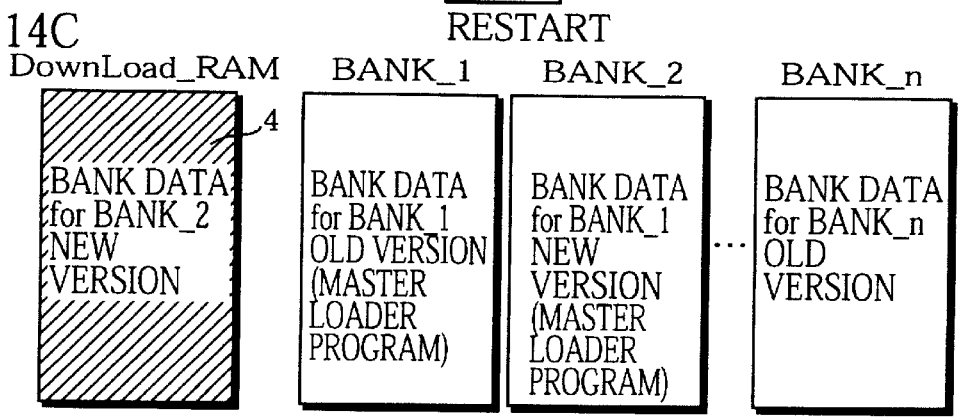

Here, a private stream including new bank data for bank 2 which was the recoverable bank is stored into the download RAM 4 as shown in FIG. 14C as a result of periodical transmission of the bank data from the host station. The processor 6 checks a CRC of the private stream (Step S12), judges whether the new bank data is included in the private stream (Step S13), and detects a target bank of the new bank data (Step S14). The processor 6 then judges whether the target bank is the former loader bank (Step S22). Since the target bank is the recoverable bank, the processor 6 chooses "No" in Step S22 and proceeds to Step S26.

The processor 6 judges whether the target bank is the former recoverable bank (Step S26). If so, the processor 6 judges whether the recoverable bank has been altered to the new loader bank (Step S27). If the recoverable bank has not been altered, the processor 6 writes the new bank data into the recoverable bank (Step S29) and completes the upgrade processing.

If the recoverable bank (bank 2) has been altered to the new loader bank as in the present example shown in FIG. 14B, the processor 6 chooses "Yes" in Step S27 and proceeds to Step S28.

The processor 6 alters bank 1 which has been altered to the old loader bank in Step S24 to a recoverable bank (Step S28). As a result, bank 1 is the recoverable bank and bank 2 is the loader bank after completing Step S28.

Figure 14D:
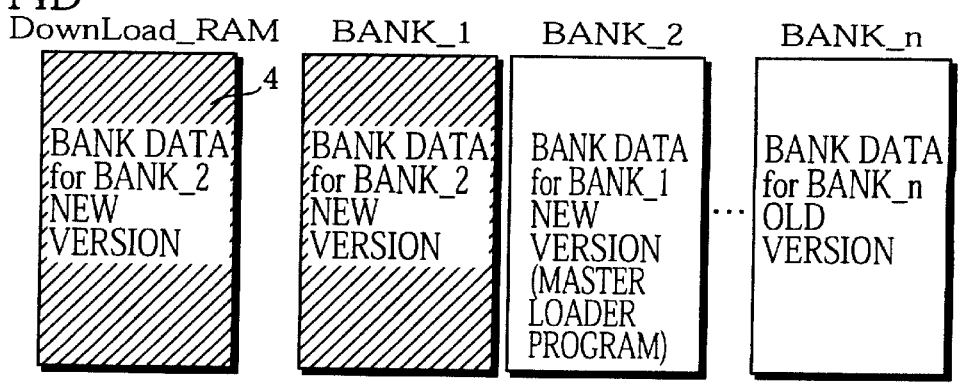

The processor 6 then writes the new bank data stored in the download RAM 4 into bank 1 which is the new recoverable bank (Step S29). FIG. 14D shows a final state of the upgrade processing shown in FIG. 10. As shown in the figure, banks 1 and 2 are both upgraded while being respectively altered so as to become the recoverable bank and the loader bank.

In the present embodiment, when new bank data for the loader bank is transmitted from the host station, the new bank data is written into the recoverable bank and the loader bank is changed to a new recoverable bank. Thus, the loader program can be upgraded using only the master loader program. Accordingly, more software modules can be stored in the terminal device 10 in place of the backup loader program.

Third Embodiment

Figure 6:
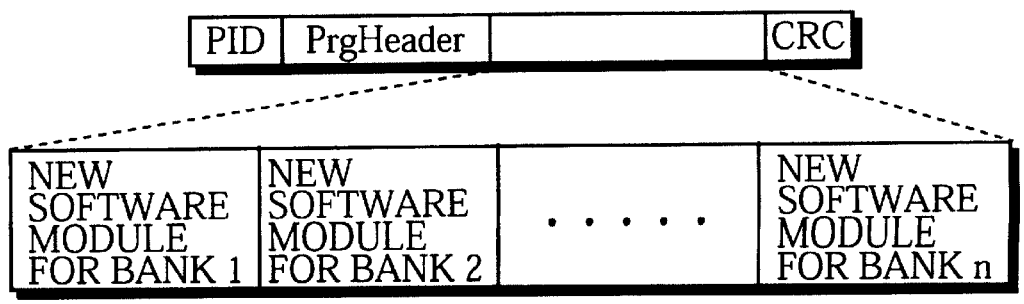
FIG. 6 shows the construction of a private stream of the third embodiment.

In the third embodiment, the upgrade is performed in units of software modules. FIG. 6 shows the construction of a private stream in the third embodiment. The difference with the first embodiment lies in that n software modules for different banks are multiplexed in one private stream.

Figure 7:
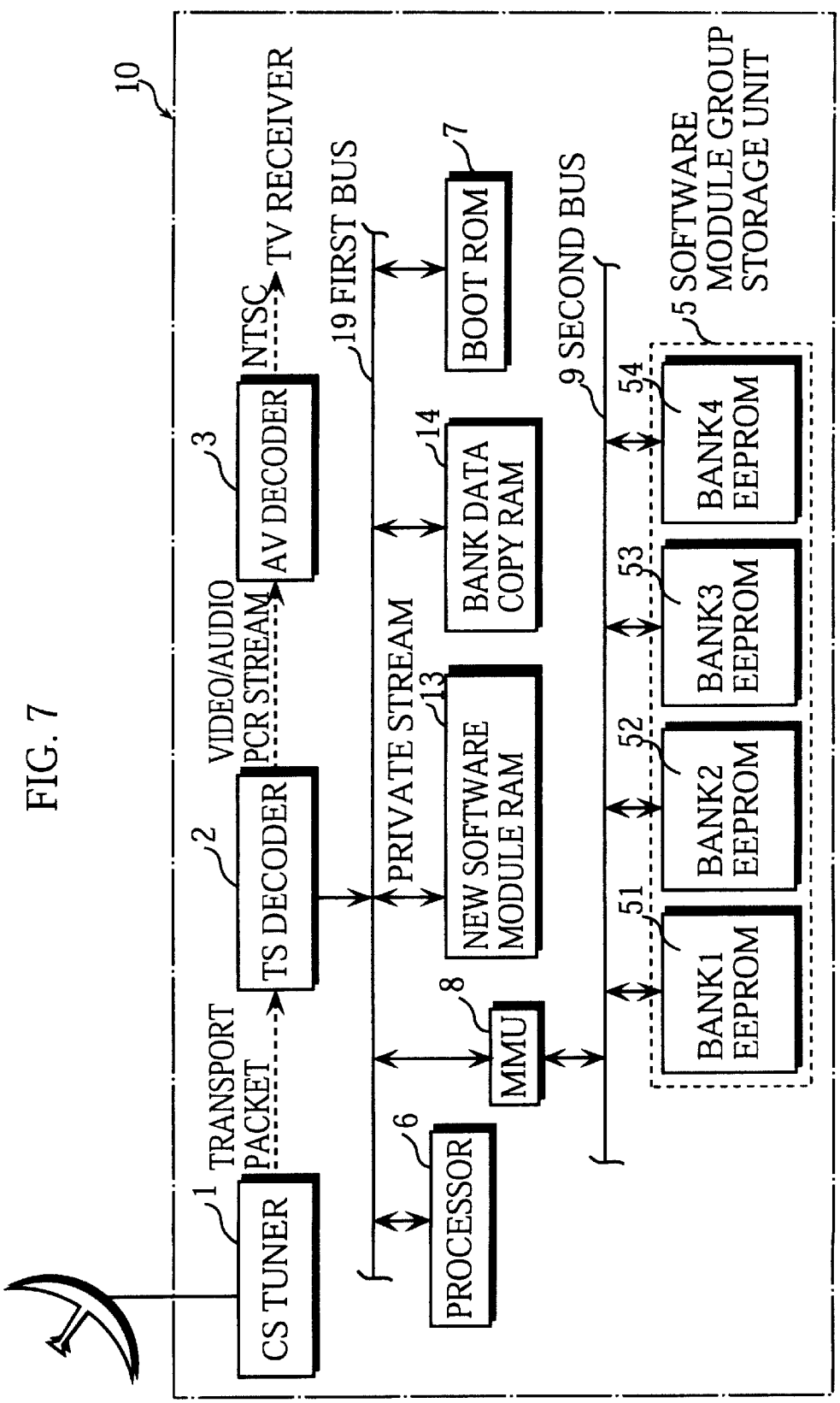
FIG. 7 shows the construction of the terminal device 10 of the third embodiment.

FIG. 7 shows the construction of the terminal device 10 of the third embodiment. The difference with the terminal device 10 shown in FIG. 2 lies in that the download RAM 4 is replaced with a new software module RAM 13 and a bank data copy RAM 14.

The new software module RAM 13 stores a private stream into which software modules have been multiplexed, the private stream having been separated by the TS decoder 2.

The bank data copy RAM 14 is used to store bank data when replacing software modules. In the software module replacement, when a new software module is stored into the new software module RAM 13, bank data which includes the old software module corresponding to the new software module is written from a bank into the bank data copy RAM 14 so that the old software module in the copied data in the bank data copy RAM 14 can be replaced with the new software module. This revised bank data is then overwritten into the original bank.

FIG. 11 is a flowchart showing the loader program processing in units of software modules. FIGS. 15A–15D and 16A–16C show states of the software module upgrade processing.

Figure 15A:
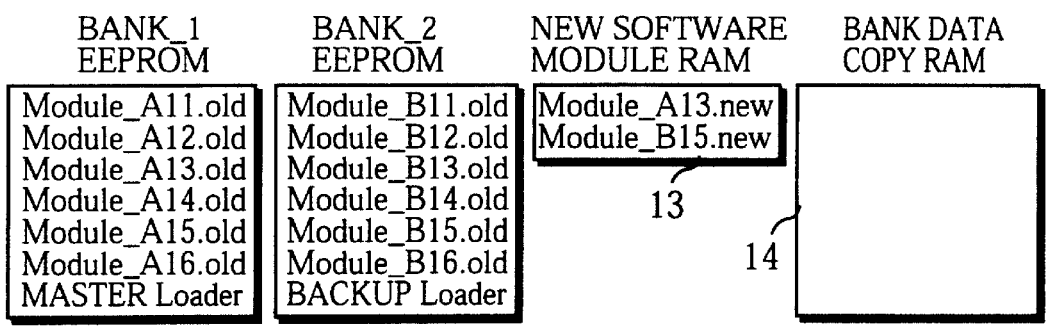
FIGS. 15A–15D show how each software module for a respective bank is stored into the ROM according to a loader program of the third embodiment.

FIG. 15A shows an initial state of the processing. In the figure, software modules A11.old to A16.old are stored in bank 1, and software modules B11.old to B16.old are stored in bank 2. A title "old" indicates that the software module is the old version. Two software modules A13.new and B15.new are stored in the new software module RAM 13. These are new software modules that were included in a private stream separated by the TS decoder 2.

When the terminal device 10 is switched on, the processor 6 starts to monitor whether a private stream has been newly stored into the new software module RAM 13 (Step S31 in FIG. 11). When a private stream has been stored, the processor 6 checks a CRC of the private stream (Step S32). If no error is detected, the processor 6 obtains n new software modules included in the private stream (Step S33) and sets an initial value of a variable i (Step S34). The variable i is used for specifying each of the n software modules stored in the new software module RAM 13. By setting the variable i at 1, the first software module among the n software modules is set as a processing object.

The processor 6 obtains version information in a module header of the "i"th software module (Step S35) and detects a bank number k in the version information (Step S36).

Figure 15B:
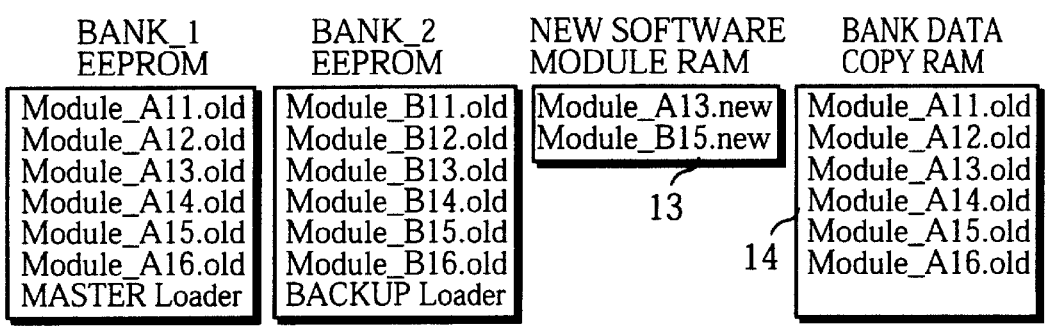

Since the first software module in the new software module RAM 13 is new software module A13.new with the version information specifying bank number 1, bank 1 is recognized as a target bank. The processor 6 then writes bank data stored in the bank k (bank 1) into the bank data copy RAM 14 (Step S37). FIG. 15B shows a first intermediate state after completing Step S37. In the figure, software modules A11.old to A16.old stored in bank 1 have been written in the bank data copy RAM 14.

The processor 6 then replaces a corresponding old software module in the bank data copy RAM 14 with the "i"th (first) software module stored in the new software module RAM 13 (Step S38).

Figure 15C:
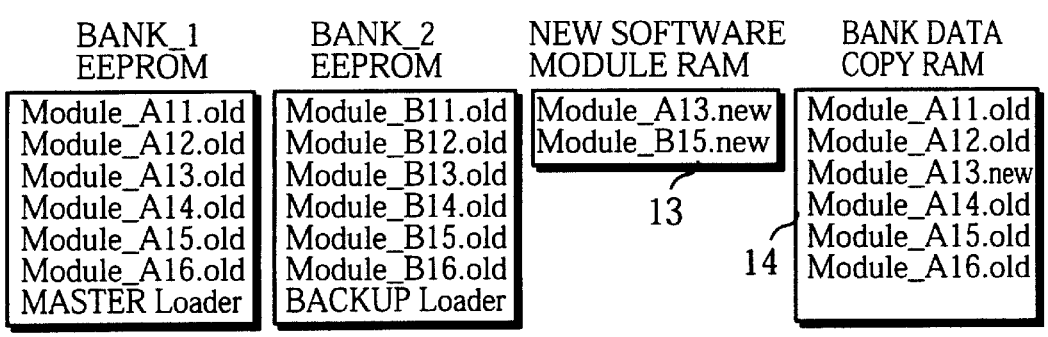

FIG. 15C shows a second intermediate state after completing Step S38. In the figure, software module A13.old is replaced with software module A13.new in the bank data copy RAM 14. Thus, software module A13.old in bank 1 is upgraded.

The processor 6 writes the revised bank data from the bank data copy RAM 14 back into the bank k (bank 1) (Step S39).

Figure 15D:
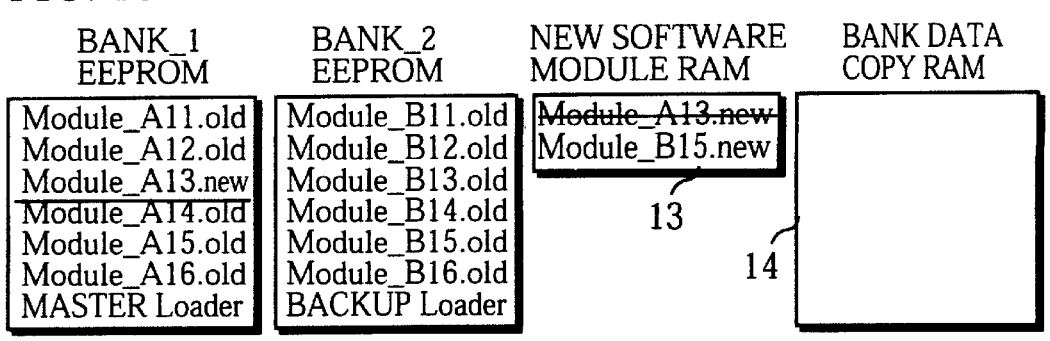

FIG. 15D shows a third intermediate state after completing Step S39. In the figure, the bank data which includes new software module A13.new is stored in bank 1. On completing the upgrade processing for the first software module, the processor 6 judges whether i=n (Step S40). When i≠n, the processor 6 increments the variable i by 1 (Step S41) and returns to Step S35.

The processor 6 obtains version information of the second software module stored in the new software module RAM 13 (Step S35) and detects a bank number k in the version information (Step S36)

Figure 16A:
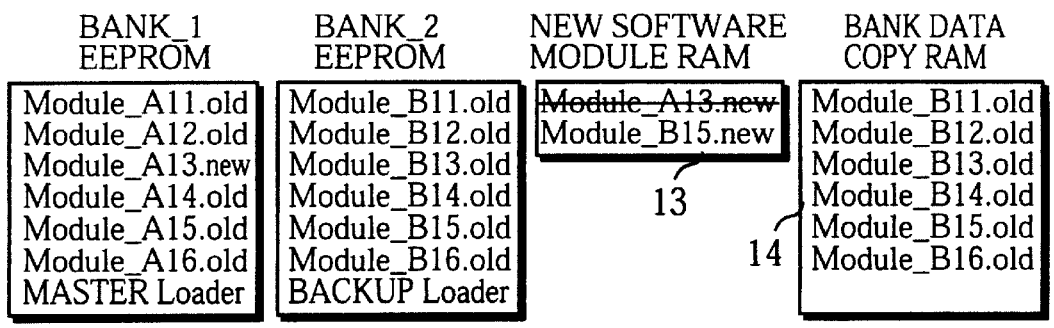
FIGS. 16A–16C show how each software module for a respective bank is stored into the ROM according to the loader program of the third embodiment.

Here, the second software module is software module B15.new with a bank number specifying bank 2. Accordingly, the processor 6 recognizes bank 2 as a target bank. The processor 6 then writes bank data stored in the bank k (bank 2) into the bank data copy RAM 14 (Step S37). FIG. 16A shows a fourth intermediate state after completing Step S37. As shown in the figure, software modules B11.old to B16.old stored in bank 2 are written in the bank data copy RAM 14.

The processor 6 then replaces a corresponding old software module in the bank data copy RAM 14 with the "i"th (second) software module stored in the new software module RAM 13 (Step S38).

Figure 16B:
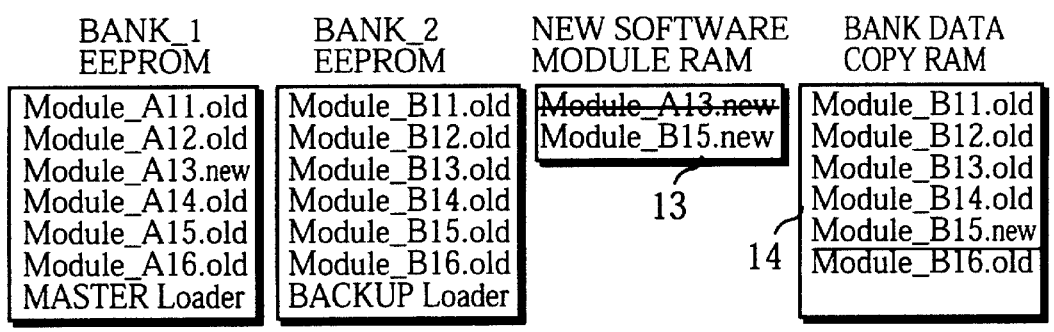

FIG. 16B shows a fifth intermediate state after completing Step S38. As shown in the figure, software module B15.old is replaced with new software module B15.new in the bank data copy RAM 14. Thus, software module B15.old in bank 2 is upgraded.

The processor 6 writes the revised bank data from the bank data copy RAM 14 back into the bank k (bank 2) (Step S39).

Figure 16C:
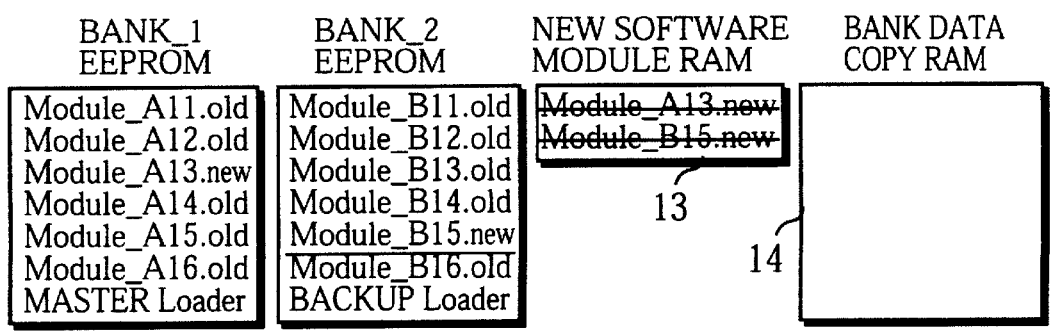

FIG. 16C shows a final state after completing Step S39. As shown in the figure, the bank data which includes new software module B15.new is stored in bank 2.

On completing the upgrade processing for the second software module, the processor 6 judges whether i=n (Step S40). Here, since i=n=2, the upgrade processing for all new software modules in the new software module RAM 13 is completed.

In the third embodiment, the terminal device 10 receives the new version of software modules to be upgraded from the host station and performs the upgrade processing in units of software modules. When compared with the first and second embodiments where the upgrade processing is performed in bank units, the upgrade can be completed in a shorter processing time.

Fourth Embodiment

Figure 17:
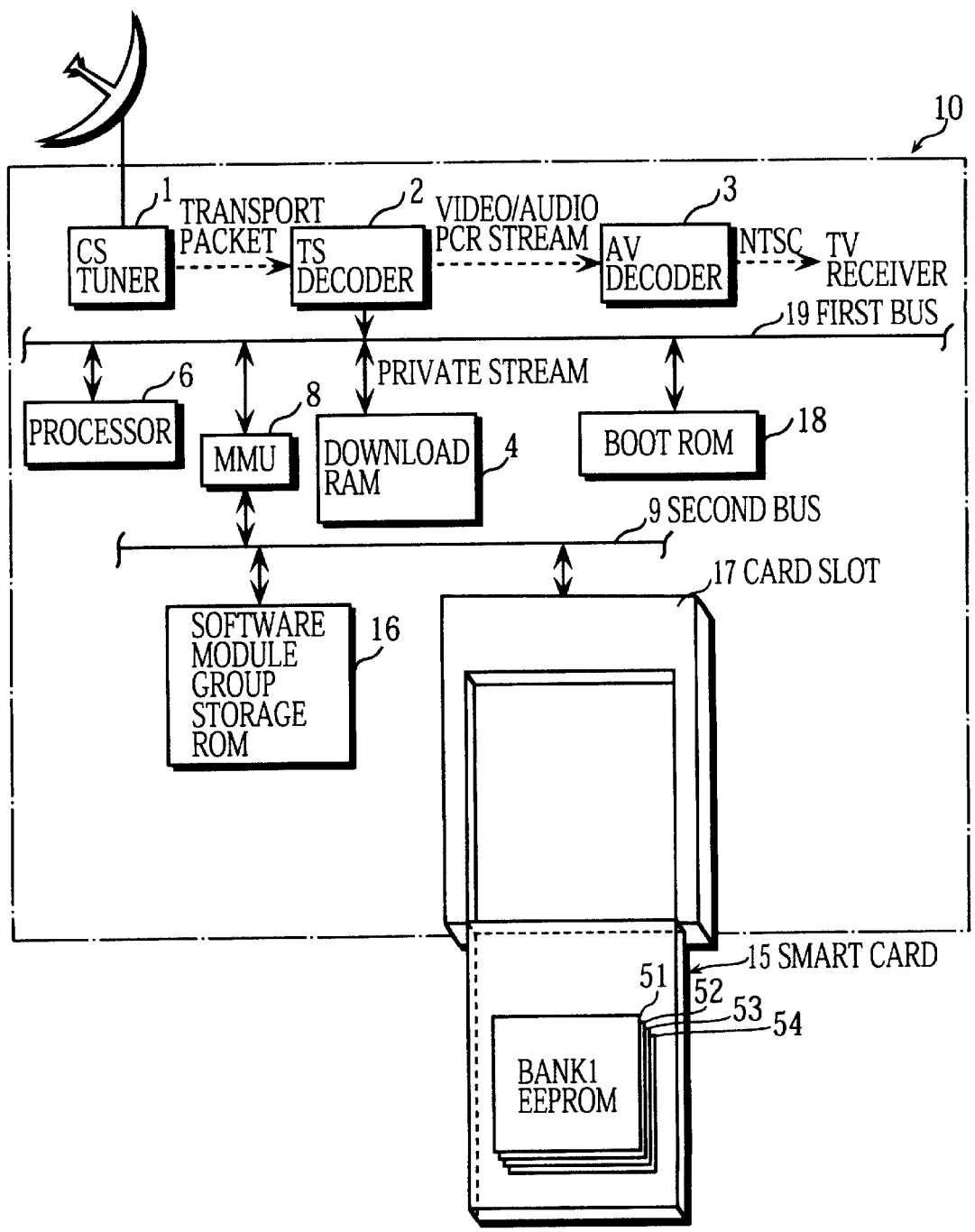
FIG. 17 shows the construction of the terminal device 10 of the fourth embodiment.

In the fourth embodiment, it is possible to perform remote upgrades of software in a terminal device which does not have the upgrade functioning, by loading a smart card 15 into the terminal device. FIG. 17 shows the construction of the terminal device 10 of the fourth embodiment. When compared with the terminal device 10 shown in FIG. 2, a software module group storage ROM 16 and a card slot 17 are connected to the second bus 9 in place of the software module group storage unit 5, and a boot ROM 18 is connected to the first bus 19 in place of the boot ROM 7.

The smart card 15 is a memory card containing the EEPROMs 51–54 which were included in the terminal device 10 of the first to third embodiments. Its connector, package, and electric characteristics are designed in accordance with, for example, PCMCIA (Personal Computer Memory Card International Association) Standard.

The software module group storage ROM 16 stores the same software modules as the software module group storage unit 5 of the first to third embodiments, so that processing other than the remote download can be performed with the software module group storage ROM 16.

The card slot 17 is used for loading the smart card 15 into the terminal device 10. Once the smart card 15 is loaded into the terminal device 10, the EEPROMs 51–54 in the smart card 15 are connected to the second bus 9 and become accessible by the processor 6.

The boot ROM 18 is used for checking a loading state of the smart card 15 in the card slot 17 when the terminal device 10 is switched on. When the smart card 15 is not loaded in the card slot 17, the processor 6 performs a bootstrap for starting each software module stored in the software module group storage ROM 16. When, on the other hand, the smart card 15 is loaded in the card slot 17, the processor 6 performs a bootstrap for starting each software module stored in the EEPROMs 51–54 in the smart card 15.

With the present embodiment, if a terminal device that was manufactured and sold at a time when remote upgrades of software were not possible has a card slot 17, then it is possible to perform remote upgrades of software in the same way as the first embodiment of the present invention by merely attaching the smart card 15.

Fifth Embodiment

Figure 18:
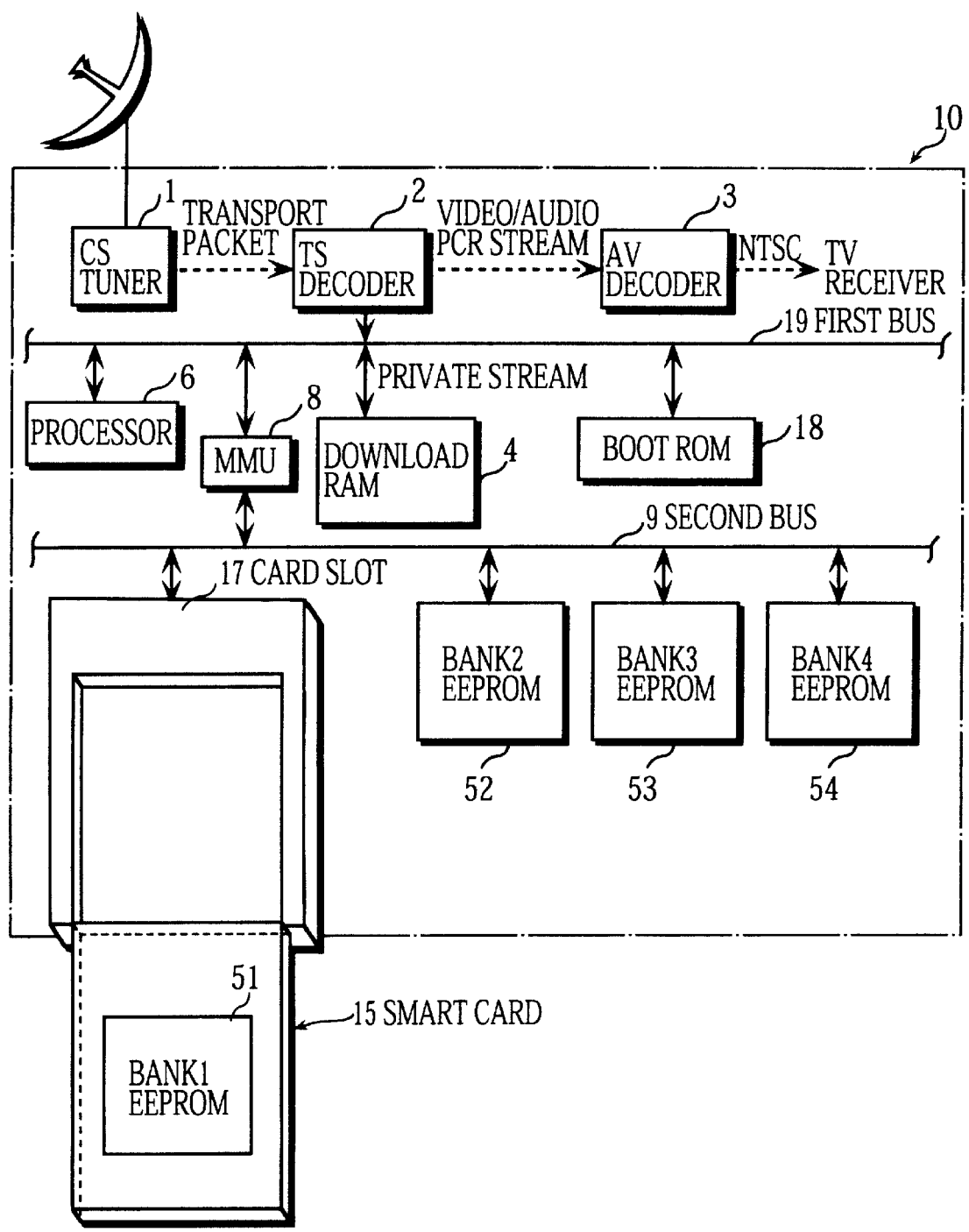
FIG. 18 shows the construction of the terminal device 10 of the fifth embodiment.

In the fifth embodiment, a smart card 15 is loaded into a terminal device in order to upgrade a loader program. FIG. 18 shows the construction of a terminal device 10 of the fifth embodiment. When compared with the terminal device 10 in FIG. 2, a card slot 17 is connected to the second bus 9 in place of the EEPROM 51, and a boot ROM 18 is connected to the first bus 19 in place of the boot ROM 7.

The smart card 15 in the present embodiment contains the EEPROM 51 which was connected to the second bus 9 in the first to third embodiments.

The EEPROM 52 stores a loader program and a kernel, so that the processing other than the remote download can be performed with the EEPROMs 52–54.

The boot ROM 18 is used for checking a loading state of the smart card 15 in the card slot 17 when the terminal device 10 is switched on. When the smart card 15 is not loaded in the card slot 17, the processor 6 performs a bootstrap for starting the loader program and the kernel stored in the EEPROM 52. When, on the other hand, the smart card 15 is loaded in the card slot 17, the processor 6 performs a bootstrap for starting a loader program and a kernel stored in the EEPROM 51 in the smart card 15.

The loader program can be upgraded in the same way as the first embodiment by storing the loader program and the kernel both in the EEPROMs 51 and 52. That is to say, when new software modules for bank 1 in the EEPROM 51 are stored into the download RAM 4, the new software modules can be written into the EEPROM 51 by switching the activated program from the loader program in the EEPROM 51 to the loader program in the EEPROM 52.

With the present embodiment, if a terminal device that was manufactured and sold at a time when remote upgrades of software were not possible has a card slot 17, then it is possible to perform remote upgrades of software in the same way as the first embodiment of the present invention by merely attaching the smart card 15.

While a smart card 15 that conforms to PCMCIA Standard is used in the terminal device 10 of the fourth and fifth embodiments, a card which conforms to other standards may also be used. Also, an other erasable storage medium, such as a phase change-type optical DVD-RAM, may be used instead of the smart card 15. In such a case, the terminal device 10 is equipped with a disc driver instead of the card slot 17 in order to load the DVD-RAM which stores software modules.

While the above first to fifth embodiments have been explained as examples of achieving the effects of the invention, the present invention is not limited to such but can be applied to any system for ensuring that activation will be possible for a terminal device. For instance, the following modifications are possible.

(a) While the upgrade processing is started once the terminal device receives new bank data in the above embodiments, the new bank data may be stored in a RAM until the user touches an end button or a power button, with the upgrade processing starting thereafter.

(b) Other constructions may be used for the program header and the module header. For example, a program name, a data size, a storage address in a bank, and version information may be included in a header of bank data.

(c) While a target bank is detected by the processor 6 referring to a bank number written in a program or module header of each private stream or each software module according to a loader program in the above embodiments, other methods may be used instead. For example, a target bank may be determined according to information such as the program name and the version information.

(d) The present invention is not limited to a digital satellite broadcast service but can also be applied to other broadcast services, such as the digital CATV.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. A download method applied to a loader program used in a terminal device which includes: a memory having n areas that store a total of m software modules, wherein $m \geq n \geq 2$, two loader programs being respectively stored in two different areas of the n areas; a reception unit for receiving a new set of software modules to which a set of software modules stored in any of the n areas is to be upgraded, wherein the reception unit receives the new set of software modules together with target area information indicating the area into which the new set of software modules is to be written; and an execution unit for executing one of the loader programs, the download method comprising:

an identification step of identifying the area which stores the set of software modules corresponding to the received new set of software modules, as a target area wherein the identification step includes a first recognition substep of recognizing the target area information accompanying the received new set of software modules, and;

a judgment step of judging whether the target area is an area that stores the loader program which is currently active wherein the judgment step includes:

a second recognition substep of recognizing the area that stores the currently active loader program, after the target area information is recognized and a judgment substep of judging whether the area indicated by the target area information recognized in the first recognition substep is the area recognized in the second recognition substep;

a write step of writing the received new set of software modules into the target area to upgrade the set of software modules in the target area, if the target area is an area other than the area that stores the currently active loader program; and, an activation step performed by the execution unit for activating, if the target area is the area that stores the currently active loader program, the other inactive loader program.

2. A download method applied to a loader program used in a terminal device which includes: a memory having n areas that store a total of m software modules, wherein m≧n≧2, the loader program being stored in one of the n areas; a reception unit for receiving a new set of software modules corresponding to a set of software modules stored in any of the n areas; and an execution unit for executing the loader program, the download method comprising:

an identification step of identifying the area which stores the set of software modules corresponding to the received new set of software modules;

a first judgment step of judging whether the identified area is the area that stores the currently active loader program;

a first write step of writing, if the identified area is an old loader area that stores the currently active loader program, the received new set of software modules into an area, hereinafter called a new loader area, that is different from the old loader area;

an activation step performed by the execution unit, for activating a new loader program included in the new set of software modules written in the new loader area;

a second judgment step of judging after the new loader program is activated, whether the reception unit receives a new set of software modules corresponding to a set of software modules which was previously stored in the new loader area; and a second write step of writing, once the reception unit has received the new set of software modules corresponding to the set of software modules previously stored in the new loader area, the received new set of software into the old loader area.

3. A download method applied to a loader program used in a terminal device which includes: a memory having n areas that store a total of m software modules, wherein m≧n≧2, the loader program being stored in one of the n areas; a reception unit for receiving a new software module corresponding to a software module included in a set of software modules stored in any of the n areas; a buffer having a capacity of storing a set of software modules stored in any of the n areas; and an execution unit for executing the loader program the download method comprising:

an identification step of identifying the area which stores the software module corresponding to the received new software module;

a first write step of writing the set of software modules stored in the identified area into the buffer;

a replacement step of replacing the software module in the buffer which corresponds to the received new software module, with the new software module;

a second write step of writing the set of software modules in which the new software module has replaced the software module, from the buffer into the identified area.

4. A storage medium storing a loader program that is readable by a terminal device which includes: a memory having n areas that store a total of m software modules, wherein m≧n≧2, two loader programs being respectively stored in two different areas of the n areas; a reception unit for receiving a new set of software modules to which a set of software modules stored in any of the n areas is to be upgraded wherein the reception unit receives the new set of software modules together with target area information indicating the area into which the new set of software modules is to be written; and an execution unit for executing one of the loader programs;

the loader program comprising:

an identification step of identifying the area which stores the set of software modules corresponding to the received new set of software modules, as a target area wherein the identification step includes a first recognition substep of recognizing the target area information accompanying the received new set of software modules;

a judgment step of judging whether the target area is an area that stores the currently active loader program wherein the judgment step includes:

a second recognition substep of recognizing the area that stores the currently active loader program, after the target area information is recognized; and a judgment substep of judging whether the area indicated by the target area information recognized in the first recognition substep is the area recognized in the second recognition substep;

a write step of writing the received new set of software modules into the target area to upgrade the set of software modules in the target area, if the target area is an area other than the area that stores the currently active loader program; and an activation step performed by the execution unit for activating, if the target area is the area that stores the currently active loader program, the other loader program.

5. A storage medium storing a loader program that is readable by a terminal device which includes: a memory having n areas that store a total of m software modules, wherein m≧n≧2, the loader program being stored in one of the n areas; a reception unit for receiving a new set of software modules corresponding to a set of software modules stored in any of the n areas; and an execution unit for executing the loader program, the loader program comprising:

an identification step of identifying the area which stores the set of software modules corresponding to the received new set of software modules:

a first judgment step of judging whether the identified area is the area that stores the currently active loader program;

a first write step of writing, if the identified area is an old loader area that stores the currently active loader program, the received new set of software modules into an area, hereinafter called a new loader area, that is different from the old loader area;

an activation step performed by the execution unit, for activating a new loader program included in the new set of software modules written in the new loader area;

a second judgment step of judging, after the new loader program is activated, whether the reception unit receives a new set of software modules corresponding to a set of software modules which was previously stored in the new loader area; and a second write step of writing, once the reception unit has received the new set of software modules corresponding to the set of software modules previously stored in the new loader area, the received new set of software modules into the old loader area.

6. A storage medium storing a loader program that is readable by a terminal device which includes: a memory having n areas that store a total of m software modules, wherein m≧n≧2, the loader program being stored in one of the n areas; a reception unit for receiving a new software module corresponding to a software module included in a set of software modules stored in any of the n areas; a buffer having a capacity for storing a set of software modules stored in any of the n areas; and an execution unit for executing the loader program, the loader program comprising:

an identification step of identifying the area which stores the software module corresponding to the received new software module;

a first write step of writing the set of software modules stored in the identified area into the buffer;

a replacement step of replacing the software module in the buffer which corresponds to the received new software module, with the new software module;

a second write step of writing the set of software modules in which the new software module has replaced the software module, from the buffer into the identified area.

7. A terminal device including: a memory having n areas that store a total of m software modules, wherein m≧n≧2, two loader programs being respectively stored in two different areas of the n areas; a reception unit for receiving a new set of software modules to which a set of software modules stored in any of the n areas is to be upgraded wherein the reception unit receives the new set of software modules together with target area information indicating the area into which the new set of software modules is to be written; and an execution unit for executing one of the loader programs, through the execution of the loader program by the execution unit the terminal device performing:

an identification process of identifying the area which stores the set of software modules corresponding to the received new set of software modules, as a target area wherein the identification process includes a first recognition subprocess of recognizing the target area information accompanying the received new set of software modules;

a judgment process of judging whether the target area is an area that stores the loader program which is currently active wherein the judgment step includes:

a second recognition subprocess of recognizing the area that stores the currently active loader program, after the target area information is recognized; and a judgment subprocess of judging whether the area indicated by the target area information recognized in the first recognition subprocess is the area recognized in the second recognition subprocess;

a write process of writing the received new set of software modules into the target area to upgrade the set of software modules in the target area, if the target area is an area other than the area that stores the currently active loader program; and, an activation process of activating, if the target area is the area that stores the currently active loader program, the other program.

8. A terminal device including: a memory having n areas that store a total of m software modules, wherein m≧n≧2, a loader program being stored in one of the n areas; a reception unit for receiving a new set of software modules corresponding to a set of software modules stored in any of the n areas; and an execution unit for executing the loader program, through the execution of the loader program by the execution unit the terminal device performing:

an identification process of identifying the area which stores the set of software modules corresponding to the received new set of software modules;

a first judgment process of judging whether the identified area is the area that stores the loader program that is currently active;

a first write process of writing, if the identified area is an old loader area that stores the currently active loader program, the received new set of software modules into a new loader area, that is different from the old loader area;

an activation process of activating a new loader program included in the new set of software modules written in the new loader area;

a second judgment process of judging, after the new loader program is activated, whether the reception unit receives a new set of software modules corresponding to a set of software modules which was previously stored in the new loader area; and a second write process of writing, once the reception unit has received the new set of software modules corresponding to the set of software modules previously stored in the new loader area, the received new set of software into the old loader area.

9. A terminal device including: a memory having n areas that store a total of m software modules, wherein m≧n≧2, a loader program being stored in one of the n areas; a reception unit for receiving a new software module corresponding to a software module included in a set of software modules stored in any of the n areas; a buffer having a capacity of storing a set of software modules stored in any of the n areas; and an execution unit for executing the loader program, through the execution of the loader program by the execution unit the terminal device performing:

an identification process of identifying the area which stores the software module corresponding to the received new software module;

a first write process of writing the set of software modules stored in the identified area into the buffer;

a replacement process of replacing the software module in the buffer which corresponds to the received new software module, with the new software module;

a second write process of writing the set of software modules in which the new software module has replaced the software module, from the buffer into the identified area.

* * * * *